US010978705B2

(12) United States Patent
Wang et al.

(10) Patent No.: US 10,978,705 B2
(45) Date of Patent: Apr. 13, 2021

(54) BISMUTH COMPOSITE NANOPARTICLE ANODES, METHODS OF MAKING SAME, AND USES THEREOF

(71) Applicant: University of Maryland, College Park, College Park, MD (US)

(72) Inventors: YuHuang Wang, Laurel, MD (US); Chuanfu Sun, College Park, MD (US)

(73) Assignee: University of Maryland, College Park, College Park, MD (US)

( * ) Notice: Subject to any disclaimer, the term of this patent is extended or adjusted under 35 U.S.C. 154(b) by 55 days.

(21) Appl. No.: 16/102,553

(22) Filed: Aug. 13, 2018

(65) Prior Publication Data

US 2019/0051898 A1    Feb. 14, 2019

Related U.S. Application Data

(60) Provisional application No. 62/544,044, filed on Aug. 11, 2017.

(51) Int. Cl.
| | |
|---|---|
| H01M 4/485 | (2010.01) |
| H01M 10/0525 | (2010.01) |
| H01M 4/1395 | (2010.01) |
| H01M 4/62 | (2006.01) |
| H01M 4/136 | (2010.01) |
| H01M 4/134 | (2010.01) |
| H01M 4/1397 | (2010.01) |
| H01M 4/36 | (2006.01) |
| H01M 4/38 | (2006.01) |
| H01M 4/58 | (2010.01) |
| H01M 4/02 | (2006.01) |

(52) U.S. Cl.
CPC .......... *H01M 4/485* (2013.01); *H01M 4/134* (2013.01); *H01M 4/136* (2013.01); *H01M 4/1395* (2013.01); *H01M 4/1397* (2013.01); *H01M 4/366* (2013.01); *H01M 4/38* (2013.01); *H01M 4/5825* (2013.01); *H01M 4/625* (2013.01); *H01M 10/0525* (2013.01); *H01M 2004/028* (2013.01)

(58) Field of Classification Search
None
See application file for complete search history.

(56) References Cited

PUBLICATIONS

Mo, Xiangyin et al., "Carbon-coated, Bismuth-substituted, Lithium Iron Phosphate as Cathode Material for Lithium Secondary Batteries", 2013, Advanced Materials Research, vol. 739, pp. 21-25. (Year: 2013).*

* cited by examiner

*Primary Examiner* — Karie O'Neill Apicella
(74) *Attorney, Agent, or Firm* — Hodgson Russ LLP

(57) ABSTRACT

Provided are bismuth composite anodes and methods of making same. The bismuth composite anodes comprise nanomaterials comprising bismuth domains (e.g., bismuth nanoparticles) disposed in a lithium phosphate material. The bismuth domains (e.g., bismuth nanoparticles) may be formed in situ. The nanomaterials may be at least partially or completely covered in a layer of a conducting material. The bismuth composite anodes also comprise a bulk conducting material. The nanomaterials and bulk conducting materials are present as a mixture. Also, provided are batteries comprising one or more bismuth composite anodes.

17 Claims, 22 Drawing Sheets

BISMUTH COMPOSITE NANOPARTICLE ANODES, METHODS OF MAKING SAME, AND USES THEREOF

CROSS REFERENCE TO RELATED APPLICATIONS

This application claims priority to U.S. Provisional Application No. 62/544,044, filed on Aug. 11, 2017, the disclosure of which is hereby incorporated by reference.

STATEMENT REGARDING FEDERALLY SPONSORED RESEARCH

This invention was made with government support under DESC0001160 awarded by the Department of Energy. The government has certain rights in the invention.

FIELD OF THE DISCLOSURE

The disclosure generally relates to bismuth composite anodes. More particularly the disclosure generally relates to batteries with composite bismuth composite anodes.

BACKGROUND OF THE DISCLOSURE

Graphite, the key anode material since the first launch of the rechargeable lithium-ion batteries (LIBs) in 1991, stores lithium ions (Li$^+$) through their intercalation into the graphitic layers at ~0.1 V versus Li/Li$^+$. This low working potential is relatively safe in portable electronics; however, this is not the case for electric vehicle batteries where a considerably larger current is necessary. At high currents polarization drives the operation potential of graphite down to 0 V where lithium-plating readily occurs, resulting in internal short-circuit and serious safety concerns. To address this issue, Li$_4$Ti$_5$O$_{12}$ (LTO) has recently been launched as an alternative anode material for electrical vehicle batteries because its high operation potential of ~1.55 V makes it possible to effectively block lithium plating. This significantly improved battery safety, however, is achieved at the expense of specific capacity, cell voltage, and energy density. To mitigate these sacrifices, it is crucial to find alternative electrochemistries that have an equilibrium operation potential of ~1 V while providing Li$^+$ storage capacity that is at least comparable to that of graphite. To this end, important efforts have been dedicated to both organic materials such as conjugated dicarboxylate and inorganic materials such as LiVS$_2$, LiTiS$_2$, LiV$_{0.5}$Ti$_{0.5}$S$_2$, and bismuth (Bi) metal, but before any practical realization their inferior electrochemical cyclability issue has to be addressed.

Bismuth is a lithium-ion battery anode material that can operate at an equilibrium potential higher than graphite and provide a capacity twice as high as that of Li$_4$Ti$_5$O$_{12}$, making it intrinsically free from lithium plating that may cause catastrophic battery failure. However, the potential of bismuth is hampered by its inferior cyclability arising from its intrinsic brittleness.

In particular, the bismuth anode operating at ~0.8 V exhibits the highest specific capacity (385 mAh/g) among the aforementioned materials, and also the highest volumetric capacity up to 1746 milliampere hour per cubic centimeter (mAh/cm$^3$), more than twice that of graphite (FIG. 1a). Moreover, its potential hysteresis (lithiation/delithiation potential gap) is only ~0.1 V which is at the same low level as graphite and outperforms other alloy/conversion-type anodes (FIG. 1b). This small potential hysteresis is highly desirable and allows the bismuth anode to achieve high energy efficiency. In addition, the cost of bismuth is comparable to materials used in practical batteries such as Sn, Ti, and Co. However, despite these remarkable merits, bismuth has poor cyclability (tens of cycles) which arises from the brittle nature of the metal. Upon electrochemical cycling, it tends to pulverize although the volume change is moderate (~42%, corresponding to the formation of Li$_3$Bi), resulting in the loss of electrical integrity and thus rapid capacity fading (FIG. 1c). This is in contrast to silicon which experiences enormous volume changes (~270%) and whose pulverization issue can be avoided by using sub-150 nm nanostructures. For brittle metals the pulverization issue persists even when the size is under sub-10 nm. Therefore, the key challenge for the bismuth anode lies in overcoming its intrinsic brittleness. This distinct behavior calls for new methodologies besides "nanosizing" to harness the potential of brittle anode materials such as bismuth. Bismuth-carbon nanocomposite and Bi$_2$O$_3$ have been proposed to improve the structural stability of Bi by dispersing Bi particles in carbon or electrochemically formed Li$_2$O; however, their cyclabilities are still subordinate (>40% loss in 100 cycles). Bi$_2$S$_3$ and its carbon composites have also been demonstrated as anodes for LIBs with cyclabilities from tens of to one hundred cycles. The constructed Li$_2$S matrix, however, is unstable and converts into Bi$_2$S$_3$ at ~2.1 V which is generally considered as cathode rather than anode reactions due to its high redox potential.

Based on the foregoing, there exists and ongoing an unmet need for improved bismuth-based anode materials.

SUMMARY OF THE DISCLOSURE

The present disclosure provides composite anodes. The present disclosure also provides methods of making the composite anodes and uses thereof.

In an aspect, the present disclosure provides composite anodes. The composite anodes comprise a mixture of nanostructures and a bulk conducting material. The nanostructures comprise a plurality of bismuth domains (e.g., bismuth nanoparticles) disposed in a lithium phosphate material.

In an example, a composite anode comprises: a plurality of nanostructures, each nanostructure comprising: a plurality of bismuth nanoparticles; and lithium phosphate (Li$_3$PO$_4$), and a layer of conducting material. The bismuth nanoparticles are disposed in the lithium phosphate, and layer of conducting material forms at least a portion of an exterior surface of the nanostructure and is disposed on at least a portion of an exterior surface of the lithium phosphate; and a conducting carbon material plurality of carbon nanotubes. The nanostructures may be BiPO$_4$@G materials. The bismuth domains (e.g., bismuth nanoparticles) are individual continuous bismuth phases. The bismuth domains (e.g., bismuth nanoparticles) may be in the form of bismuth nanoparticles.

In an aspect, the present disclosure provides methods of forming a composite anode material/composite anode (e.g., a composite anode material/composite anode of the present disclosure). The methods may use preformed bismuth nanoparticles or may form bismuth domains (e.g., bismuth nanoparticles) in situ.

In an example, a method of forming a composite anode (e.g., a composite anode of the present disclosure) comprises: reacting an aqueous reaction mixture comprising: graphene oxide, one or more bismuth salt, a phosphate precursor to form the plurality of nanostructures (e.g., BiPO$_4$@G material); mixing the plurality of nanostructures (e.g., BiPO$_4$@G material) with a plurality of carbon nanotubes, forming a composite electrode from the mixture of the plurality of nanostructures (e.g., BiPO$_4$@G material) and conducting carbon material (bulk carbon material), and, optionally, annealing the mixture. A method may further comprise forming a film from the mixture of nanostructures and bulk conducting carbon material.

Various bismuth salts may be used. Combinations of bismuth salt may be used. Non-limiting examples of bismuth salts include bismuth nitrate, bismuth sulfate, bismuth chloride, and the like, and combinations thereof.

In an aspect, the present disclosure provides uses of the composite electrodes of the present disclosure. For example, composite electrodes of the present disclosure are used in batteries (e.g., rechargeable batteries).

A battery (e.g., a rechargeable battery), which may be a lithium-ion-conducting battery, a sodium-ion-conducting battery, or a potassium-ion conducting battery, comprises one or more composite anode material of the present disclosure (e.g., an anode comprising one or more anode material of the present disclosure) or an anode made by a method of the present disclosure. In an example, a battery comprises a cathode (or a cathode material), an anode material (e.g., an anode comprising one or more anode material), an electrolyte, and, optionally, a separator.

BRIEF DESCRIPTION OF THE FIGURES

For a fuller understanding of the nature and objects of the disclosure, reference should be made to the following detailed description taken in conjunction with the accompanying figures.

DETAILED DESCRIPTION OF THE DISCLOSURE

Figure 1:
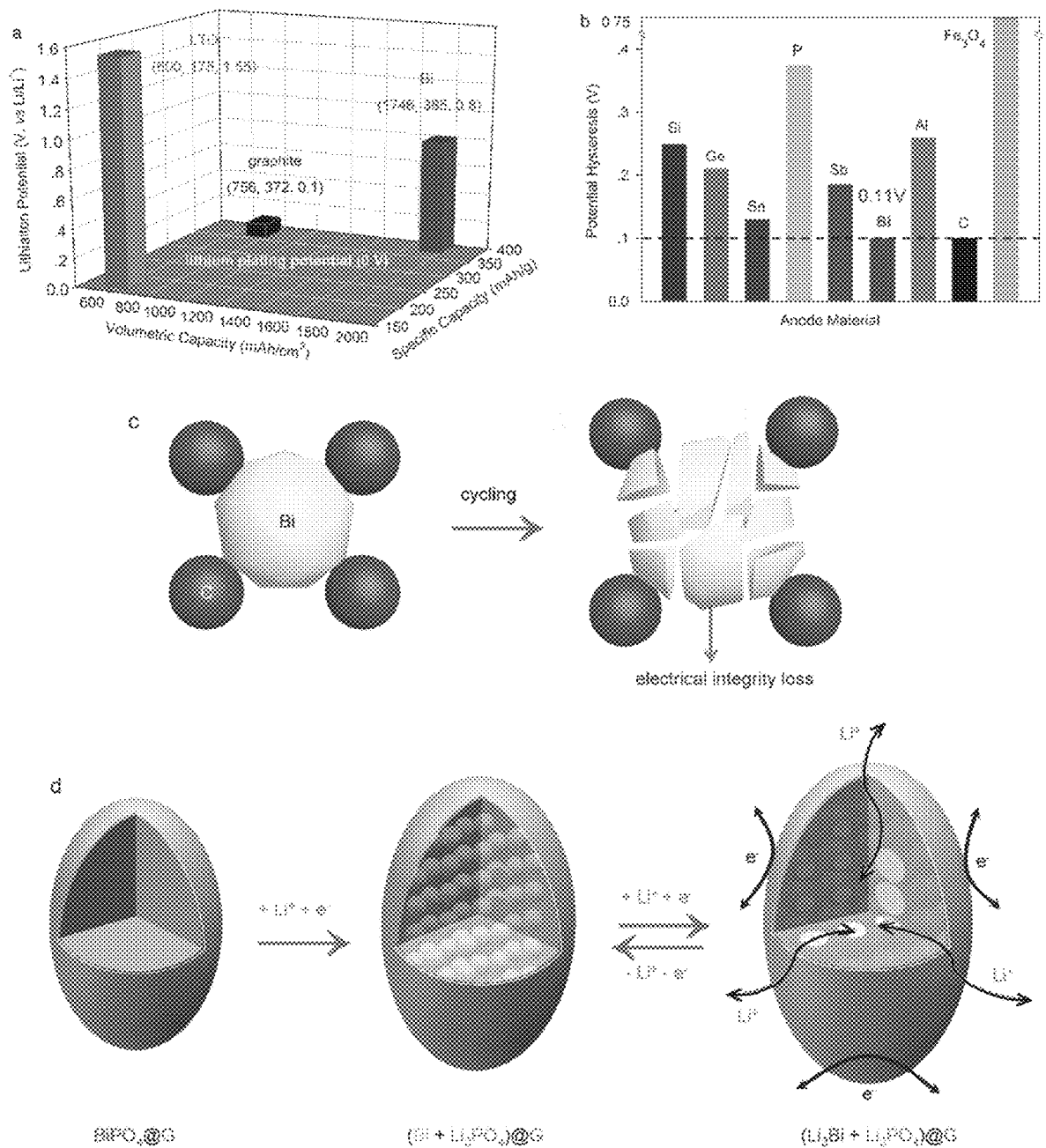
FIG. 1 shows bismuth's energy storage potential harnessed through a solid-state Li$_3$PO$_4$ matrix. (a,b) Comparisons of electrochemical performances among graphite, LTO and Bi anodes. (c,d) Schematics illustrate Li$_3$PO$_4$ matrix enables long-cycle-life bismuth anodes. Bi pulverizes upon cycling due to its brittle nature, resulting in loss of electrical integrity and thus repaid capacity fading. The electrochemically constructed Li$_3$PO$_4$ enables Bi grains physically and ionically interconnected, while the graphene coating facilitates fast electron transport.

Although claimed subject matter will be described in terms of certain embodiments and examples, other embodiments and examples, including embodiments and examples that do not provide all of the benefits and features set forth herein, are also within the scope of this disclosure. Various structural, logical, and process step changes may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

The present disclosure provides composite anodes. The present disclosure also provides methods of making the composite anodes and uses thereof.

The present disclosure uses what may be referred to as an "ion conductive solid-state matrix" approach to address the bismuth brittleness issue. This approach homogeneously confines bismuth domains (e.g., bismuth nanoparticles) in a solid-state $Li_3PO_4$ (e.g., γ-$Li_3PO_4$) matrix that may be electrochemically formed in situ. In an example, the resulting composite anode exhibits a reversible capacity of 280 milliampere hour per gram (mAh/g) at a rate of 100 mA/g and a record cyclability among bismuth-based anodes up to 500 cycles with a capacity decay rate of merely 0.071% per cycle. In an example, it was shown that full-cell batteries fabricated from this composite anode and commercial $LiFePO_4$ cathode deliver a stable cell voltage of ~2.5 V and remarkable energy efficiency of up to 86.3%, on par with practical batteries (80%-90%). This simple and impactful "solid-state $Li_3PO_4$ matrix" method is described herein.

In an aspect, the present disclosure provides composite anodes. The composite anodes comprise a mixture of nanostructures and a bulk conducting material. The nanostructures comprise a plurality of bismuth domains (e.g., bismuth nanoparticles) disposed in an ion-conducting matrix (e.g., lithium phosphate) material. In various examples, bismuth nanoparticles are sequestered or encapsulated or confined in the lithium phosphate.

In an example, a composite anode comprises: a plurality of nanostructures, each nanostructure comprising: a plurality of bismuth nanoparticles, lithium phosphate ($Li_3PO_4$), and a layer of carbon conducting material. The bismuth nanoparticles are disposed in the lithium phosphate, and the layer of conducting material forms at least a portion of an exterior surface of the structure and is disposed on at least a portion of an exterior surface of the lithium phosphate; and a conducting carbon material plurality of carbon nanotubes. In various examples, the nanostructures are $BiPO_4$@G materials.

The bismuth domains (e.g., bismuth nanoparticles) are individual continuous bismuth phases. The bismuth domains (e.g., bismuth nanoparticles) may be in the form of bismuth nanoparticles.

A nanomaterial comprises a plurality of bismuth domains (e.g., bismuth nanoparticles). The bismuth domains (e.g., bismuth nanoparticles) can be present in various amounts. Combinations of nanomaterials (e.g., structurally different and/or compositionally different nanomaterials) may be used. At least a portion or all of the plurality of the bismuth domains (e.g., bismuth nanoparticles) are in electrical contact through carbon (e.g., through the layer of conducting carbon material and/or the bulk carbon conducting material). For example, the bismuth domains (e.g., bismuth nanoparticles) comprise 1 weight % to 64 weight %, including all 0.1 weight % values and ranges therebetween, of the composite anode.

The bismuth domains (e.g., bismuth nanoparticles) can have various shapes and sizes. For example, an individual bismuth domain (e.g., bismuth nanoparticle) or the bismuth domains (e.g., bismuth nanoparticles) has/have a size (e.g., longest dimension, such as, for example, a diameter, or at least two dimensions) or an average (e.g., an arithmetic mean) size of 1 to 100 nanometers, including all nanometer values and ranges therebetween. In an example, an individual bismuth domain (e.g., bismuth nanoparticle) or the bismuth domains (e.g., bismuth nanoparticles) has/have a size of 1-20 nanometers. For example, the bismuth domains (e.g., bismuth nanoparticles) are ellipsoidal.

The bismuth domains (e.g., bismuth nanoparticles) are disposed (e.g., confined) an ion conductive solid-state matrix. The solid-state matrix may be lithium phosphate (such as, for example, γ-$Li_3PO_4$). In an example, the bismuth domains (e.g., bismuth nanoparticles), which may comprise one or more bismuth grains, are physically and ionically interconnected in the solid-state matrix (e.g., $Li_3PO_4$, which may be electrochemically constructed). The layer of conducing material (e.g., while the graphene coating facilitates desirable electron transport.

The bismuth domains (e.g., bismuth nanoparticles) may be homogenously distributed in the lithium phosphate. By "homogenously distributed in the lithium phosphate," it is meant that the bismuth domains (e.g., bismuth nanoparticles) uniformly distributed in and separated by the lithium phosphate matrix material.

The bismuth domains (e.g., bismuth nanoparticles) may be formed independently. For example, bismuth domains (e.g., bismuth nanoparticles) are formed in the absence of lithium phosphate or phosphate precursor(s). For example, bismuth domains (e.g., bismuth nanoparticles) are formed from a bismuth salt as part of the nanostructure preparation (e.g., in the presence of graphene oxide and/or phosphate precursor(s)).

The bismuth domains (e.g., bismuth nanoparticles) may be formed in situ. For example, bismuth domains (e.g., bismuth nanoparticles) are formed electrochemically in situ from bismuth phosphate ($BiPO_4$). The bismuth phosphate may be at least partially encapsulated by a conducing material (e.g., graphene, graphene oxide, amorphous carbon, or a combination thereof).

A composite anode may comprise one or more carbon conducting material that is disposed on at least a portion of an exterior surface or all of the exterior surfaces of the matrix material. The carbon conducting material may be in the form of a layer. The layer may be a continuous layer. As $BiPO_4$ and $Li_3PO_4$ are electrically insulating, the carbon conducting material coating can provide improved (relative to the same materials in the absence of the conducing material) electron transfer between the matrix/bismuth domain (e.g., bismuth nanoparticle) material and the bulk conducting material.

Various carbon conducting materials can be used to form the layer of conducing material that forms at least a portion or all of the exterior surface of a nanomaterial. In various examples, the layer is formed from graphene, graphene oxide, amorphous carbon, or a combination thereof. For example, the conducing material is one or more layers of graphene and/or reduced graphene oxide. In an example, the layer is 1 to 100 layers, including all integer number of layers and ranges therebetween, of graphene, graphene oxide, or a combination thereof.

An anode comprises a conducting material present as a mixture with the nanomaterial(s). This conducting material may be referred to as a bulk conducting material. Various materials can be used as a bulk conducting materials. Combinations of conducting materials can be used. Non-limiting examples of conducting materials include conducting carbon materials (i.e., carbon bulk conducting materials) such as, for example, carbon nanotubes, graphene, and reduced graphene oxides. Suitable carbon materials are commercially available or can be made by methods known in the art. In an example, the bulk conducting material is a plurality of carbon nanotubes (CNTs). The CNTs may be single-walled, few-walled, multiwalled carbon nanotubes, or a combination thereof.

A composite anode or a battery comprising one or more composite anode can have one or more desirable properties. In various examples, a composite anode exhibits a reversible delithiation capacity of 100-305 mAh/g, including all mAh/g values and ranges therebetween, at a rate of, for example, 50-100 mA/g, without failing (e.g., losing electrical integrity) and/or can be cycled 100 or more cycles or 500 or more cycles or 100-500 cycles with a capacity decay rate of 0.19% or less or 0.071% or less or 0.19%-0.071%.

The bismuth domains (e.g., bismuth nanoparticles) can exhibit a reversible grain size change on lithiation. For example, when lithiated (e.g., to 1.5 V) $BiPO_4$ evolves from single nanoparticles (>100 nm) into smaller Bi nanograins (~10 nm, dark contrast in TEM image) that are homogeneously embedded in a $\gamma$-$Li_3PO_4$ matrix. When extracting lithium from $Li_3Bi$, the reformed Bi nanograins become distinctive again with the size returning to ~10 nm (FIGS. 5d, 6d). This reversible grain size change indicates that the $\gamma$-$Li_3PO_4$ matrix can effectively buffer the mechanical strain arising from lithium insertion/extraction and maintain the structural integrity at the individual nanoparticle level.

In an aspect, the present disclosure provides methods of forming a composite anode material/composite anode (e.g., a composite anode material/composite anode of the present disclosure). The methods may use preformed bismuth nanoparticles or may form bismuth domains (e.g., bismuth nanoparticles) in situ.

In an example, a method of forming a composite anode (e.g., a composite anode of the present disclosure) comprises: reacting an aqueous reaction mixture comprising: graphene oxide, one or more bismuth salt, a phosphate precursor to form the plurality of nanostructures (e.g., $BiPO_4$@G material); mixing the plurality of nanostructures (e.g., $BiPO_4$@G material) with a plurality of carbon nanotubes, forming a composite electrode from the mixture of the plurality of nanostructures (e.g., $BiPO_4$@G material) and conducting carbon material (bulk carbon material), and, optionally, annealing the mixture (e.g., annealing at 300° C. for 1 hour under an inert atmosphere, such as, for example, argon gas). In an example, the reacting and aqueous mixture comprises: forming a first aqueous reaction mixture comprising: graphene oxide, and a bismuth salt, holding the aqueous reaction mixture for a selected time and/or temperature (e.g., for 30 to 180 minutes, including all minute values and ranges therebetween, and/or at temperature of 20 to 30° C., including all 0.1° C. values and ranges therebetween), adding one or more phosphate precursor to the first reaction mixture to form a second reaction mixture; and holding the second reaction mixture for a selected time and/or temperature (e.g., for 6 to 12 hours, including all 0.1 hour values and ranges therebetween, and/or at temperature of 150 to 200° C., including all 0.1° C. values and ranges therebetween), where the plurality of nanostructures (e.g., $BiPO_4$@G material) is formed.

A method may further comprise forming a film from the mixture of nanostructures and bulk conducting carbon material. A film can have various areas and thicknesses. The film area and thickness is not particularly limited. The films can be formed by methods known in the art. In a non-limiting example, a film has an area of about 30 $cm^2$ and a thickness of about 1 cm. Of course, larger or smaller area and/or thicker or thinner films can be formed.

Various bismuth salts may be used. Combinations of bismuth salt may be used. Non-limiting examples of bismuth salts include bismuth nitrate, bismuth sulfate, bismuth chloride, and the like, and combinations thereof.

Various phosphate precursors may be used. A phosphate precursor may be phosphoric acid or a salt or mixed acid/salt thereof. Combinations of phosphate precursors may be used. Non-limiting examples of phosphate precursors include $NaH_2PO_4$, $LiH_2PO_4$, $KH_2PO_4$, $NH_4H_2PO_4$, $H_3PO_4$, and the like, and combinations thereof.

Bismuth domains (e.g., bismuth nanoparticles) may be formed electrochemically in situ from bismuth phosphate ($BiPO_4$). The bismuth phosphate may be at least partially encapsulated by a conducing material (e.g., graphene, graphene oxide, amorphous carbon, or a combination thereof).

In an example, a method of forming a composite anode (e.g., a composite anode of the present disclosure) comprises: lithiating (e.g., to 1.5 V) bismuth phosphate, where bismuth domains (e.g., bismuth nanoparticles) disposed in a lithium phosphate (e.g., $\gamma$-$Li_3PO_4$) matrix are formed. The bismuth phosphate ($BiPO_4$) may be at least partially or completely encapsulated by a layer of carbon conducting material. For example, the content of $BiPO_4$ is about ~70 wt %, for example, in $BiPO_4$@G-CNT composites.

In an aspect, the present disclosure provides uses of the composite electrodes of the present disclosure. For example, composite electrodes of the present disclosure are used in batteries (e.g., rechargeable batteries).

A battery comprises one or more composite anode material of the present disclosure (e.g., an anode comprising one or more anode material of the present disclosure) or an anode made by a method of the present disclosure. In an example, a battery comprises a cathode (or a cathode material), an anode material (e.g., an anode comprising one or more anode material), an electrolyte, and, optionally, a separator.

The battery is an ion-conducting battery (e.g., a lithium-ion conducing battery, a sodium-ion-conducing battery, potassium-ion-conducting battery, or the like). In the case of sodium-ion and potassium-ion-conducing batteries, lithium materials (e.g., precursor materials, salts in the electrolytes and cathode materials, etc.) described herein correspond to their sodium or potassium analogues in sodium-ion and potassium-ion batteries, respectively.

In an example, a battery (e.g., a rechargeable battery) comprises: a composite anode of the present disclosure or an anode made by a method of the present disclosure; a cathode; and an electrolyte. The composite anode(s) is/are in electrical contact with the electrolyte material(s).

The cathode comprises cathode material(s) in electrical contact with the electrolyte. For example, the cathode material is an ion-conducting material that stores ions by mechanisms such as intercalation or reacts with the ion to form a secondary phase (e.g., an air or sulfide electrode). Examples of suitable cathodes and cathode materials are known in the art.

Suitable cathodes and cathode materials are commercially available and can be made using methods known in the art.

A cathode can comprise various materials. Suitable cathode materials are known in the art.

The cathode material may be or may be formed from a lithium ion-conducting material. For example, the lithium ion-conducting cathode material is lithium nickel manganese cobalt oxides (NMC, $LiNi_xMn_yCo_zO_2$, where x+y+z=1), such as $LiCoO_2$, $LiNi_{1/3}Co_{1/3}Mn_{1/3}O_2$, $LiNi_{0.5}Co_{0.2}Mn_{0.3}O_2$; lithium manganese oxides (LMOs), such as $LiMn_2O_4$, $LiNi_{0.5}Mn_{1.5}O_4$; lithium iron phosphates (LFPs), such as $LiFePO_4$, $LiMnPO_4$, and $LiCoPO_4$, and $Li_2MMn_3O_8$, where M is selected from Fe, Co, and combinations thereof, $LiNi_xCo_yAl_zO_2$ (x+y+z=1); and combinations thereof. In an example, the ion-conducting cathode or cathode material is a high energy ion-conducting cathode material such as $Li_2MMn_3O_8$, wherein M is selected from Fe, Co, and combinations thereof.

The cathode material may be or may be formed from a sodium ion-conducting material. For example, the sodium ion-conducting cathode material is $Na_2V_2O_5$, P2-$Na_{2/3}Fe_{1/2}Mn_{1/2}O_2$, $Na_3V_2(PO_4)_3$, $NaMn_{1/3}Co_{1/3}Ni_{1/3}PO_4$ and composite materials (e.g., composites with carbon black) thereof such as $Na_{2/3}Fe_{1/2}Mn_{1/2}O_2$@graphene composite.

In an example, the cathode material is an air electrode. Examples of materials suitable for air electrodes include those used in solid-state lithium ion batteries with air cathodes such as large surface area carbon particles (e.g., Super P which is a conductive carbon black) and catalyst particles (e.g., alpha-$MnO_2$ nanorods) bound in a mesh (e.g., a polymer binder such as PVDF binder).

It may be desirable to use an electrically conductive material as part of the ion-conducting cathode material. In an example, the ion-conducting cathode material also comprises an electrically conducting carbon material (e.g., graphene or carbon black), and the ion-conducting cathode material, optionally, further comprises an organic or gel ion-conducting electrolyte. The electrically conductive material may separate from the ion-conducting cathode material. For example, electrically conductive material (e.g., graphene) is disposed on at least a portion of a surface (e.g., a pore surface) of the porous region of the ion-conducting, SSE electrolyte material and the ion-conducting cathode material is disposed on at least a portion of the electrically conductive material (e.g., graphene).

Various electrolyte materials can be used. The electrolyte material conducts ions (e.g., lithium ions, sodium ions, potassium ions, and the like) between the anode and cathode. Suitable electrolyte materials are known in the art. In various example, an electrolyte comprises a lithium salt (e.g., $LiPF_6$, $LiAsF_6$, $LiClO_4$, lithium bis(fluorosulfonyl) imide, lithium bis(trifluoromethanesulfonyl)imide, and the like, and combinations thereof) and one or more aliphatic carbonate (e.g., ethylene carbonate, propylene carbonate, diethyl carbonate, dimethyl carbonate, fluoroethylene carbonate, vinylene carbonate, dimethoxyethane, diethylene glycol dimethyl ether, triethylene glycol dimethyl ether, tetraethylene glycol dimethyl ether, and the like, and combinations thereof). The electrolyte may comprise one or more lithium salt and one or more aliphatic carbonate. The electrolyte may be a solution comprising one or more lithium salt and one or more aliphatic carbonate. The electrolyte may be a solid-state electrolyte (e.g., comprise a solid-state electrolyte material).

A battery may comprise a separator. Suitable separators are known in the art. Non-limiting examples of separators include polymer separators and glass fiber separators. In an example, a polymer separator is a polypropylene (e.g., Celgard® 3501, available from Celgard, LLC Corp., USA) or polyethylene separator. Non-limiting examples of glass fiber separators include glass microfiber filters (e.g., Grade GF/F glass microfiber filters, available from Whatman, USA) and the like.

The battery may comprise one or more current collector (e.g., one or more cathode-side current collector and/or an anode side current collector). For example, a battery has a cathode-side (first) current collector disposed on the cathode material and/or an anode (second) current collector disposed on the anode electrolyte material. The current collector are each independently fabricated of a metal (e.g., aluminum, copper, titanium, or the like) or metal alloy (e.g., aluminum alloy, copper alloy, titanium alloy or the like).

The battery may comprise various additional structural components (such as, for example, bipolar plates, external packaging, and electrical contacts/leads to connect wires, and the like). In an embodiment, a battery further comprises bipolar plates. In an embodiment, the battery further comprises bipolar plates and external packaging, and electrical contacts/leads to connect wires. In an embodiment, repeat battery cell units are separated by a bipolar plate.

The cathode material, the anode material, the electrolyte, the cathode-side (first) current collector (if present), and the anode-side (second) current collector (if present) may form a cell. In an example, a battery comprises a plurality of cells separated by one or more bipolar plates. The number of cells in the battery is determined by the performance requirements (e.g., voltage output) of the battery and is limited only by fabrication constraints. For example, the battery comprises 1 to 500 cells, including all integer number of cells and ranges therebetween.

The steps of the method described in the various embodiments and examples disclosed herein are sufficient to carry out the methods of the present disclosure. Thus, in an embodiment, the method consists essentially of a combination of the steps of the methods disclosed herein. In another embodiment, the method consists of such steps.

The following Statements provide examples of bismuth composite anodes of the present disclosure and methods of making and using same:

Statement 1. A composite anode comprising: a plurality of nanostructures, each nanostructure comprising: a plurality of bismuth domains (e.g., bismuth nanoparticles); and an ion-conducing matrix material (e.g., lithium phosphate such as, for example, $Li_3PO_4$, which may be $\gamma$-$Li_3PO_4$), and a layer of carbon conducting material (e.g., comprising graphene, reduced graphene oxide, or amorphous carbon), where the bismuth nanoparticles are disposed in the ion-conducing matrix material, and where the layer of carbon conducting material forms at least a portion of an exterior surface or all of the exterior surface of the nanostructure and is disposed on at least a portion of an exterior surface of the ion-conducing matrix material; and a carbon bulk conducting material.

Statement 2. A composite anode according to Statement 1, wherein the bismuth domains (e.g., bismuth nanoparticles) comprise 1 weight % to 64 weight % of the composite anode.

Statement 3. A composite anode according to Statement 1 or 2, wherein the bismuth domains (e.g., bismuth nanoparticles) have a size (e.g., longest dimension, such as, for example, a diameter) of 1 to 100 nanometers.

Statement 4. A composite anode according to any one of the preceding Statements, wherein the bismuth domains (e.g., bismuth nanoparticles) are homogenously distributed in the lithium phosphate.

Statement 5. A composite anode according to any one of the preceding Statements, wherein at least a portion of the plurality of bismuth nanoparticles are in electrical contact through carbon (e.g., through the layer of carbon conducting material and/or the carbon bulk conducting material).

Statement 6. A composite anode according to any one of the preceding Statements, wherein the graphene and/or reduced graphene oxide has a thickness of 1 to 100 individual graphene and/or reduced graphene layers.

Statement 7. A composite anode according to any one of the preceding Statements, wherein the carbon bulk conducting material is a plurality of carbon nanotubes, a graphene-containing material, or a combination thereof.

Statement 8. A composite anode according to any one of the preceding Statements, wherein the composite anode exhibits a reversible delithiation capacity of 100-305 mAh/g at a rate of 50 mA/g.

Statement 9. A composite anode according to any one of the preceding Statements, wherein the composite anode is cycled 100 or more cycles or 500 or more cycles or 100-500 cycles with a capacity decay rate of 0.19% or less or 0.071% or less or 19%-0.071%.

Statement 10. A composite anode according to any one of the preceding Statements, wherein the plurality of bismuth nanoparticles is formed in situ.

Statement 11. A composite anode according to Statement 10, wherein the plurality of bismuth nanoparticles are electrochemically formed in situ from bismuth phosphate ($BiPO_4$).

Statement 12. A composite anode according to Statement 11, wherein the bismuth phosphate ($BiPO_4$) is at least partially encapsulated by a carbon conducting material comprising graphene, reduced graphene oxide, or amorphous carbon.

Statement 13. A method of forming a composite anode according to any one of Statements 1-12 comprising:

reacting an aqueous reaction mixture comprising: graphene oxide, bismuth salt (e.g., bismuth nitrate, bismuth sulfate, bismuth chloride, and the like, and combinations thereof), one or more phosphate precursor (e.g., $NaH_2PO_4$, $LiH_2PO_4$, $KH_2PO_4$, $NH_4H_2PO_4$, $H_3PO_4$, and the like and combinations thereof) to form the plurality of nanostructures (e.g., $BiPO_4$@G material);

combining (e.g., mixing) the plurality of nanostructures (e.g., $BiPO_4$@G material) with a conducting carbon material (a carbon bulk conducting material) (e.g., a plurality of carbon nanotubes, graphene-containing materials, or a combination thereof);

forming a composite anode from the mixture of the plurality of nanostructures (e.g., $BiPO_4$@G material) and the conducting carbon material; and optionally, annealing the mixture (e.g., heating at 300° C. for 1 hour under an inert atmosphere (e.g., argon gas atmosphere).

Statement 14. A method according to Statement 13, wherein the reacting and aqueous mixture comprises:

forming a first aqueous reaction mixture comprising: graphene oxide, and a bismuth salt (e.g., bismuth nitrate, bismuth sulfate, bismuth chloride, and the like, and combinations thereof), holding the aqueous reaction mixture for a selected time and temperature (e.g., for 30 to 180 minutes at a temperature of 20 to 30° C.), adding one or more phosphate precursor (e.g., $NaH_2PO_4$, $LiH_2PO_4$, $KH_2PO_4$, $NH_4H_2PO_4$, $H_3PO_4$, and the like, and combinations thereof) to the first reaction mixture to form a second reaction mixture; and holding the second reaction mixture for a selected time and temperature (e.g., 6 to 12 hours at a temperature of 150 to 200° C.), wherein the plurality of nanostructures (e.g., $BiPO_4$@G material) is formed.

Statement 15. A method according to any one of Statements 13 or 14, wherein the forming a composite anode comprises forming a film from the mixture of the plurality of nanostructures (e.g., $BiPO_4$@G material) and carbon nanotubes.

Statement 16. A battery comprising:
a composite anode of the present disclosure (e.g., a composite anode of any one of Statements 1-13 or a composite anode made by a method of any one of Statements 13-15);
a cathode;
an electrolyte; and
optionally, a separator.

Statement 17. A battery according to Statement 16, wherein the battery is a lithium-ion-conducting battery, a sodium-ion-conducing battery, or a potassium-ion conducting battery.

Statement 18. A battery according to Statements 16 or 17, wherein the battery is a rechargeable battery.

Statement 19. A battery according to any one of Statements 16-18, wherein the battery further comprises a cathode-side current collector and/or an anode side current collector.

Statement 20. A battery according to any one of Statements 16-19, wherein the composite anode, the cathode, the electrolyte, and, optionally, the cathode-side current collector and/or an anode side current collector, form a cell, and the battery comprises a plurality of the cells and each adjacent pair of cells is separated by a bipolar plate.

The following example is presented to illustrate the present disclosure. They are not intended to limiting in any matter.

Example 1

This example provides a description of bismuth composite anodes and methods of making and using same.

It was shown that the brittleness challenge of bismuth can be addressed using a solid-state γ-$Li_3PO_4$ matrix constructed in situ by electrochemical conversion of bismuth phosphate ($BiPO_4$) (FIG. 1d). This $Li_3PO_4$ matrix possesses multiple functionalities. Firstly, it functions as a solid binder to keep the Bi grains to be physically interconnected and the structural integrity well maintained. Secondly, it serves as a buffer layer to accommodate the mechanical strain arising from the lithium insertion. Thirdly, γ-$Li_3PO_4$ has a relatively high $Li^+$ conductivity of $4.5 \times 10^{-5}$ S/m, and can provide $Li^+$ diffusion pathways to allow the active Bi grains ionically interconnected. Fourthly, it isolates Bi from liquid electrolyte and thus reduces undesirable side reactions such as the formation of solid electrolyte interphase (SEI). Last but not least, $Li_3PO_4$ is electrochemically stable within a wide potential window from 0 to 4.7 V (vs $Li/Li^+$, preserving its multiple functionalities during anode operation (typically in 0-1.5 V). In addition, we adopt graphene coating to improve the electrical conductivity of the anode. Owing to the remarkable functionalities of the $Li_3PO_4$ matrix and elevated electron transport from the graphene coating, the proposed composite anodes deliver a reversible delithiation capacity of 280 mAh/g at a rate of 100 mA/g and record cyclability among bismuth-based anodes up to 500 cycles with a tiny capacity decay rate of 0.071% per cycle. When this composite anode is coupled with a commercial LiFePO$_4$ cathode, the prototype full-cells are capable of delivering a stable cell voltage of ~2.5 V and a remarkably high energy efficiency up to 86.3%, on par with practical batteries (80%-90%).

Experimental Methods. Preparations of Composite Anodes: Graphene oxides were prepared according to a previous report. BiPO$_4$@G, BiPO$_4$ and Bi$_2$O$_3$@G nanostructures were synthesized through a modified one-step hydrothermal reaction. For the synthesis of BiPO$_4$@G, 10 mg graphene oxides were first dispersed in 10 mL ethylene glycol/water (V:V=7:3) by bath sonication (85 W, 20 minutes, VWR-B2500A-DTH), then Bi(NO$_3$)$_3$.5H$_2$O (48.5 mg, Sigma-Aldrich) was added and the mixture was kept stirring for 3 hours. NaH$_2$PO$_4$ (12 mg, Sigma-Aldrich) was subsequently added into the mixture under continuous stirring for another hour. The mixture was then transferred into a Teflon-lined stainless steel autoclave which was then kept in an oven at 160° C. for 12 hours, followed by passive cooling to room temperature. Multiwalled carbon nanotubes (CNTs) (diameter: ~50 nm) grown by chemical vapor deposition as described previously were hydrothermally treated with nitric acid (70%, Sigma-Aldrich) in a Teflon-lined stainless steel autoclave at 150° C. for 12 hours. 3 mg of such acid-treated CNTs were dispersed into a mixture of ethylene glycol/ethanol (V:V=1:1) by probe sonication (30 W, 10 minutes, Misonix Sonicator 3000). This CNT dispersion was then mixed with the above BiPO$_4$@G mixture followed by gentle bath sonication for 5 seconds (VWR-B2500A-DTH, 85 W) and stirring (5 minutes). This mixture solution was then vacuum-filtered on RTTP filter membranes (Millipore) with a pore-size of 1.2 μm. The free-standing composites were obtained by peeling them off from the filter membranes and then were dried at 100° C. for 6 hours followed by an annealing process (300° C. for 1 hour under argon protection) and a pressing process. The content of BiPO$_4$ was estimated to be ~70 wt % in BiPO$_4$@G-CNT composites. The preparations of BiPO$_4$ and Bi$_2$O$_3$@G composites followed similar processes except that graphene oxides and NaH$_2$PO$_4$ were not introduced for the synthesis of BiPO$_4$ and Bi$_2$O$_3$@G, respectively.

Materials Characterization:

The structural and chemical evolutions of the composite anodes were investigated using a field emission scanning electron microscope (SU-70, Hitachi, Inc) and a JEOL FEG transmission electron microscope. Raman spectra were collected on a Horiba Yvon LabRam ARAMIS Raman Spectroscope with a helium neon laser excitation source (632.8 nm). X-ray powder diffraction (XRD) was gathered on a Bruker D8 Advance system with CuKα radiation. X-ray Photoelectron Spectroscopy (XPS) investigation was performed on a high-sensitivity Kratos AXIS 165 spectrometer with survey pass energy of 160 eV and high-resolution pass energy of 20 eV. All the cycled samples were washed with dimethyl carbonate (DMC) three times to remove possible electrolyte residual, and then mounted on XPS holder in an argon-filled glovebox (MBraun, 0.5 ppm H$_2$O, 0.5 ppm O$_2$). The samples with the XPS holder were sealed in a plastic bag before taken out from the glovebox, and were subsequently transferred into the XPS chamber under inert conditions in a glove bag with continuous argon flow. All samples were calibrated to the C 1s peak at 284.6 eV, and peak fitting was done using the CasaXPS software.

Electrochemical Characterization:

Coin-cell batteries were assembled in an argon-filled glovebox (MBraun, 0.5 ppm H$_2$O, 0.5 ppm O$_2$) with free-standing composite anodes as the working electrode and Li foil as both reference and counter electrodes in the half-cell configuration. For the full-cell configuration, the BiPO$_4$@G free-standing composite anode was coupled with the commercial LiFePO$_4$ cathode from SAFT. Celgard®3501 (Celgard, LLC Corp., USA) was used as the separator and 1 M LiPF$_6$ in a mixture of ethylene carbonate/dimethyl carbonate (EC/DMC, 1:1 by volume) with 10% fluoroethylene carbonate (FEC) were used as an electrolyte. All the composite anodes and commercial LiFePO$_4$ cathodes were dried overnight at 100° C. under vacuum prior to battery assembly. Cyclic voltammetry (CV) measurements were performed on a bipotentiostat system (BI-STAT, Princeton Applied Research). Galvanostatic lithiation/delithiation were carried out on an Arbin BT-2000 test station (Arbin Instruments, USA) at different current densities. After reaching the cutoff voltage, the cells were relaxed for 10 minutes prior to the subsequent lithiation/delithiation. The specific capacities were calculated based on the entire mass of the composite anodes. The areal capacity and volumetric capacity were calculated based on the projected area and the volume of the free-standing composite anodes, respectively. For the prelithiation, the composite anode was sandwiched between two lithium foils and was subsequently immerged into the battery electrolyte (1 M LiPF$_6$-EC-DMC-10% FEC) for ~36 hours. To exam the structural and chemical evolutions of the composite anodes, prior to ex-situ SEM, TEM, XPS characterizations, coin-cells at varied lithiation/delithiation stages were disassembled and the composite anodes were washed with DMC three times to remove residual electrolyte. Those composite anodes that are cycled for 500 times were washed with DMC and acetonitrile prior to SEM imaging.

Figure 2:
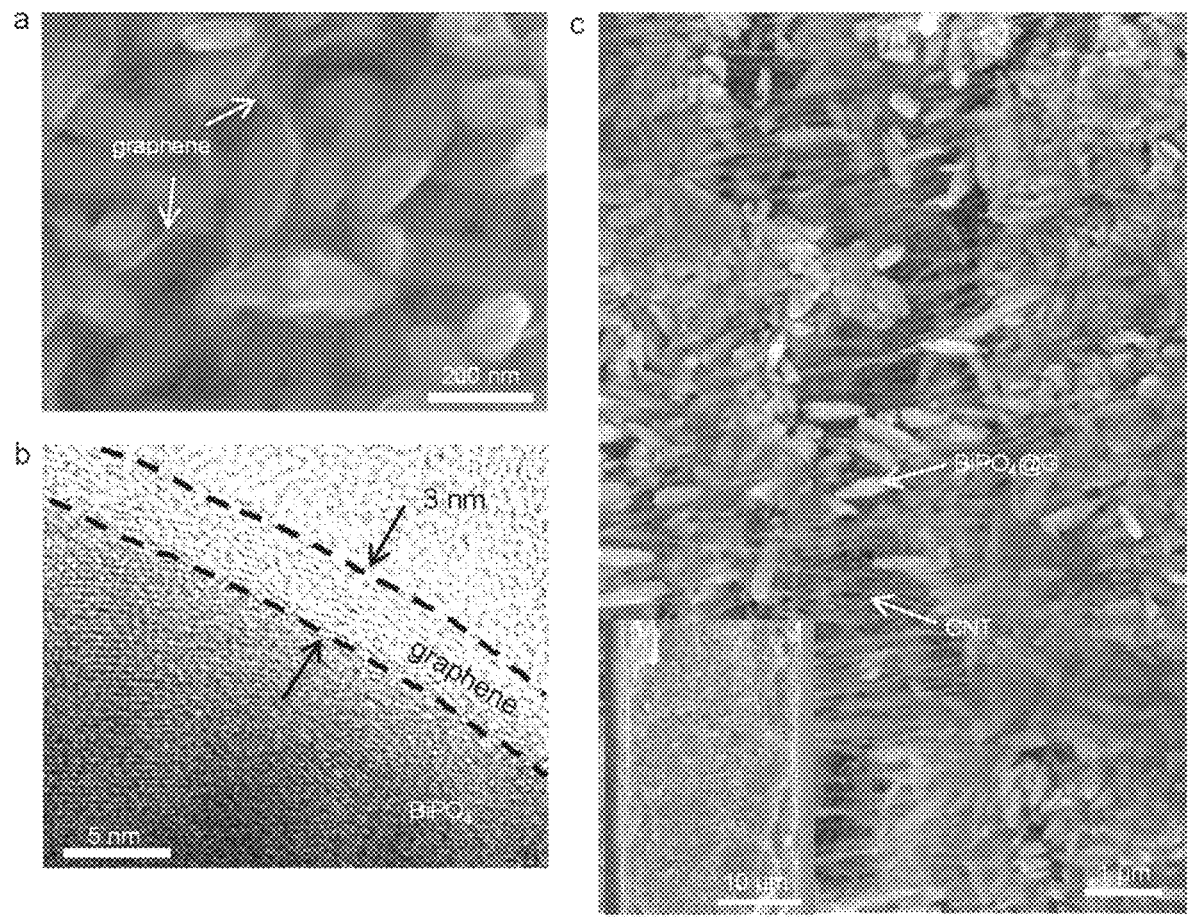
FIG. 2 shows characterization of as-synthesized BiPO$_4$@G composites. (a) SEM and (b) TEM images showing the ellipsoidal BiPO$_4$ nanoparticles which are wrapped by a ~3 nm layer of graphene. (c) SEM images showing the cross-sectional view of a free-standing 3D BiPO$_4$@G composite anode. (d,e) XRD (d) and Raman scattering (e) confirm the pure phase and chemical components of the as-synthesized BiPO$_4$@G. (f) XPS detects much less signal of Bi from BiPO$_4$@G compared to bare BiPO$_4$, indicating the BiPO$_4$ surface is well covered by graphene in BiPO$_4$@G.
Figure 2:
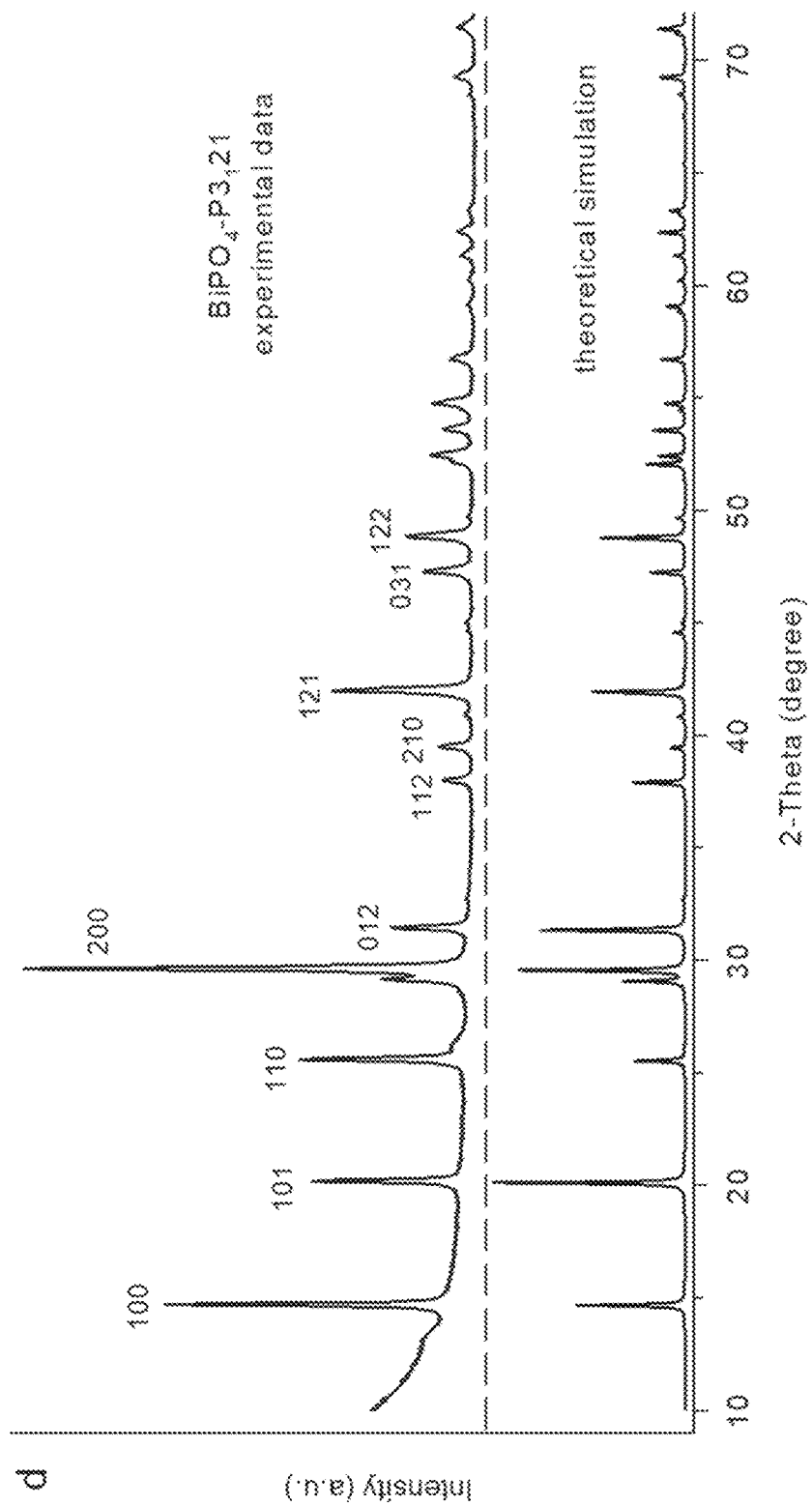
Figure 2:
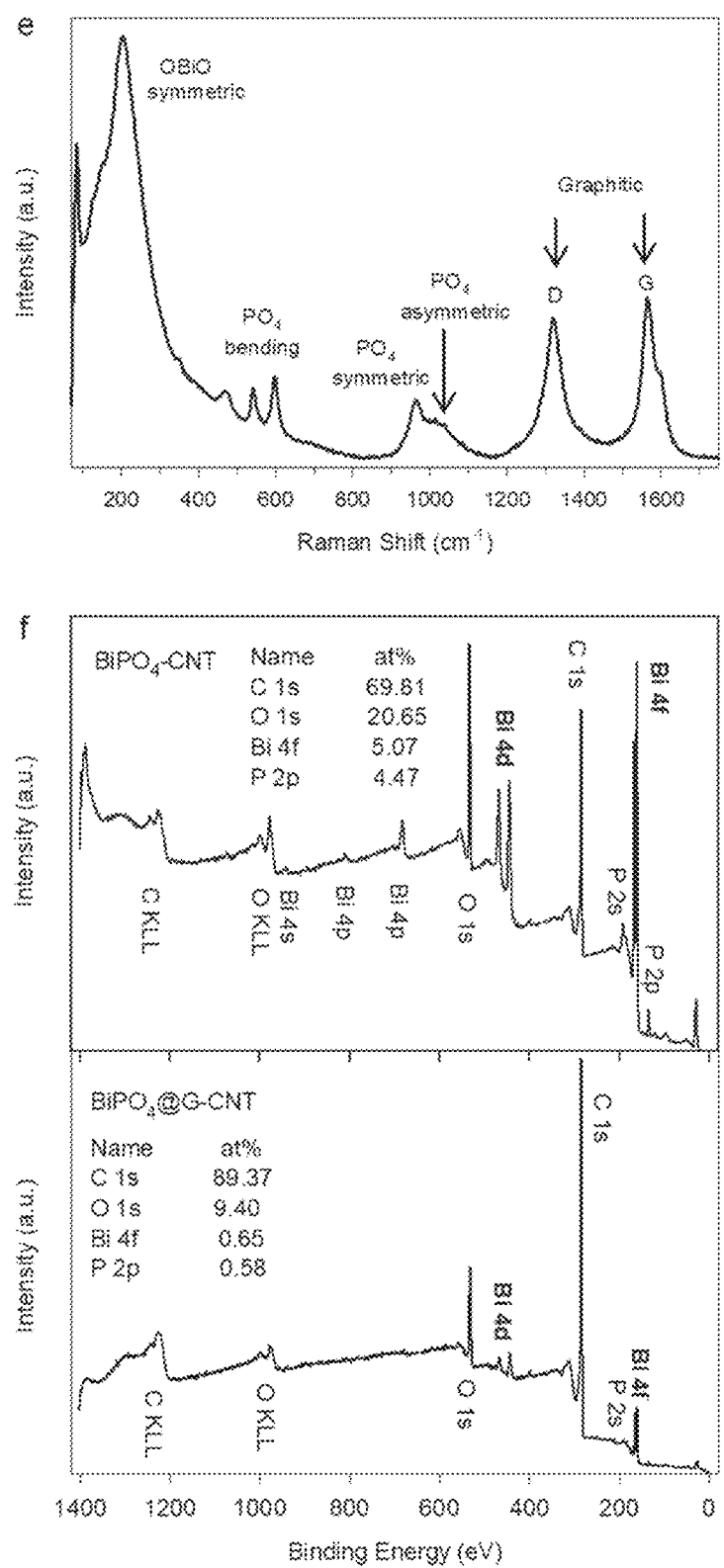
Figure 3:
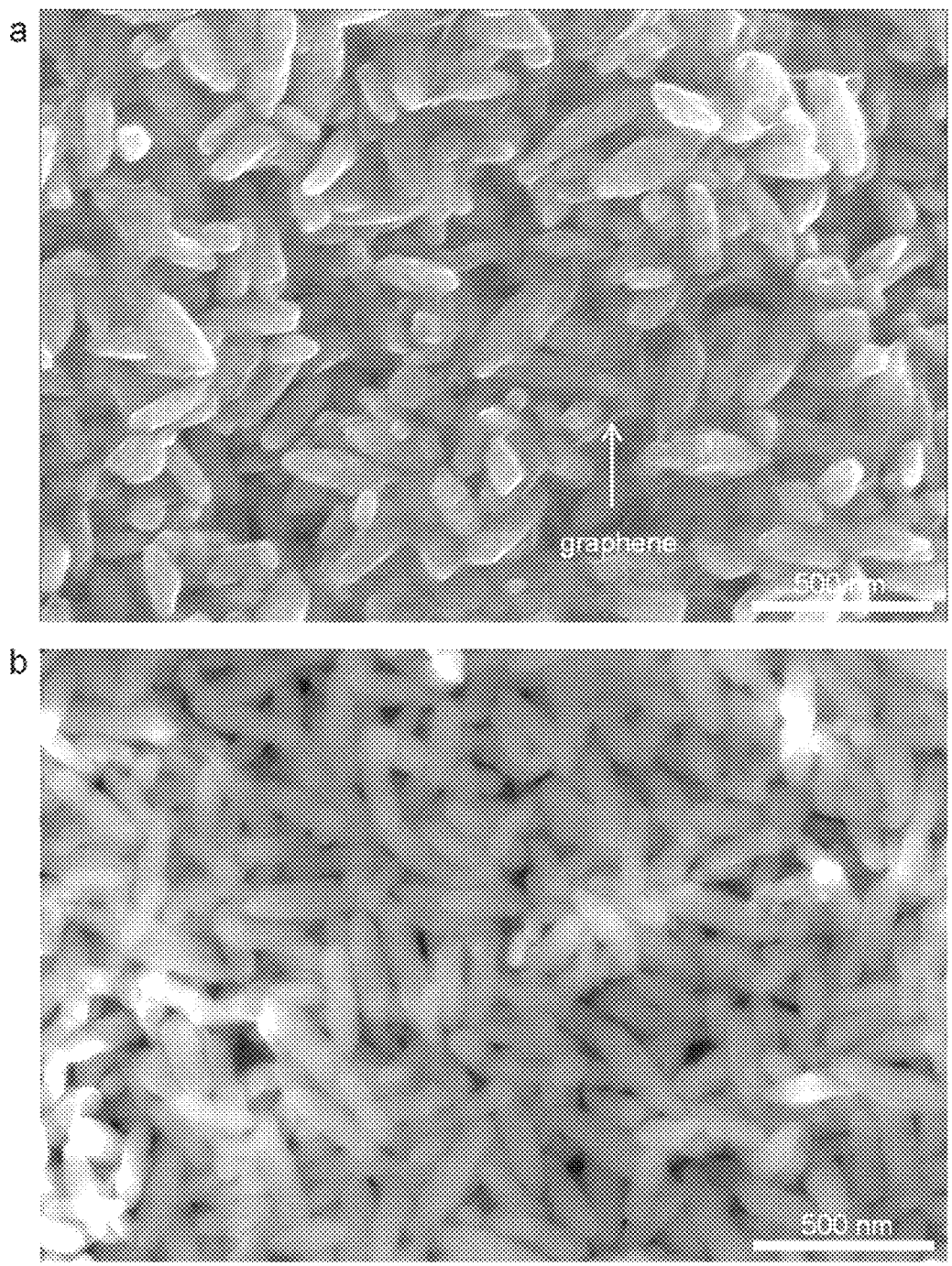
FIG. 3 shows SEM images of BiPO$_4$@G (a) and BiPO$_4$ (b). Less electron charging is observed with BiPO$_4$@G as compared to bare BiPO$_4$, demonstrating its improved electron conduction ability due to graphene wrapping.

The graphene-coated BiPO$_4$ (BiPO$_4$@G) composite electrodes were synthesized by adopting a simple, cost-effective and scalable hydrothermal reaction that has been used for the production of commercial LiFePO$_4$ cathode materials. Scanning electron microscope (SEM) images show that the as-synthesized BiPO$_4$ nanoparticles are ellipsoidal in shape with a diameter of ~100 nm and a length of several hundred nanometers (FIG. 2a, FIG. 3), and the nanoparticle is covered by a ~3 nm layer of graphene as revealed by high resolution transmission electron microscopy (HRTEM) (FIG. 2b). The purity and crystallinity of the as-synthesized BiPO$_4$ nanoparticles are also confirmed by X-ray powder diffraction (XRD) (FIG. 2d). The obtained BiPO$_4$@G nanostructures were mixed with carbon nanotubes (CNTs) and then vacuum-filtrated into films followed by annealing and pressing (See experimental details described herein). The final composite films have a thickness of ~20 μm (FIG. 2c) and are applied as free-standing anodes which have a high mass loading of 3.8 mg/cm$^2$ and a high tap density of 1.9 g/cm$^3$ (~46% higher than that of graphite, 1.3 g/cm$^3$). The CNTs not only offer mechanical support but also provide an electrically conductive matrix that enables efficient electron transport within the entire electrode. This aspect of our composite makes it possible to eliminate the heavy copper current collector thereby further increasing the overall energy density.

The composite anodes are characterized by Raman scattering and X-ray photoelectron spectroscopy (XPS) (FIG. 2e, 2f). The Raman peak at 204 cm$^{-1}$ represents the symmetric bending mode of O—Bi—O while the triplet peaks within the range of 430-630 cm$^{-1}$ correspond to the bending modes of PO$_4$ units. There are two bands centered at 963 and 999 cm$^{-1}$, that are attributed to the symmetric and asymmetric stretching modes of PO$_4$ units, respectively. Also, the characteristic graphitic sp$^3$ (D) and sp$^2$ (G) peaks from graphene and CNTs clearly present at 1320 and 1565 cm$^{-1}$, respectively. The presence of the graphene coating is further confirmed by XPS. As shown in FIG. 2f, substantially less Bi signals (0.65 at %) are detected from BiPO$_4$@G compared with BiPO$_4$ (5.07 at %), indicating the BiPO$_4$ surface is well covered by graphene (~3 nm) in BiPO$_4$@G (XPS sampling depth is typically 5-10 nm).

To capture the electrochemical construction of Li$_3$PO$_4$ matrix, cyclic voltammetry (CV) measurements (FIG. 4a) were conducted. The anodic peak at 2.1 V in the first cycle corresponds to the reduction of Bi$^{3+}$ to Bi$^0$ and the simultaneous formation of Li$_3$PO$_4$ matrix. The second anodic peak at 0.57 V represents the formation of Li$_3$Bi while the corresponding cathodic peak at 0.96 V can be assigned to the reversible extraction of Li$^+$ from Li$_3$Bi. The absence of the corresponding cathodic peak to the anodic peak at 2.1 V in the first cycle and the disappearance of this anodic peak in the subsequent cycles indicate that the reduction of Bi$^{3+}$ to Bi$^0$ is irreversible within the potential window of 0-2.5 V, and the formed Li$_3$PO$_4$ is electrochemically stable, consistent with the previously reported stability window of 0-4.7 V for Li$_3$PO$_4$. This electrochemical stability of Li$_3$PO$_4$ is highly desirable to maintain its multiple functionalities through longtime cycling.

Figure 4:
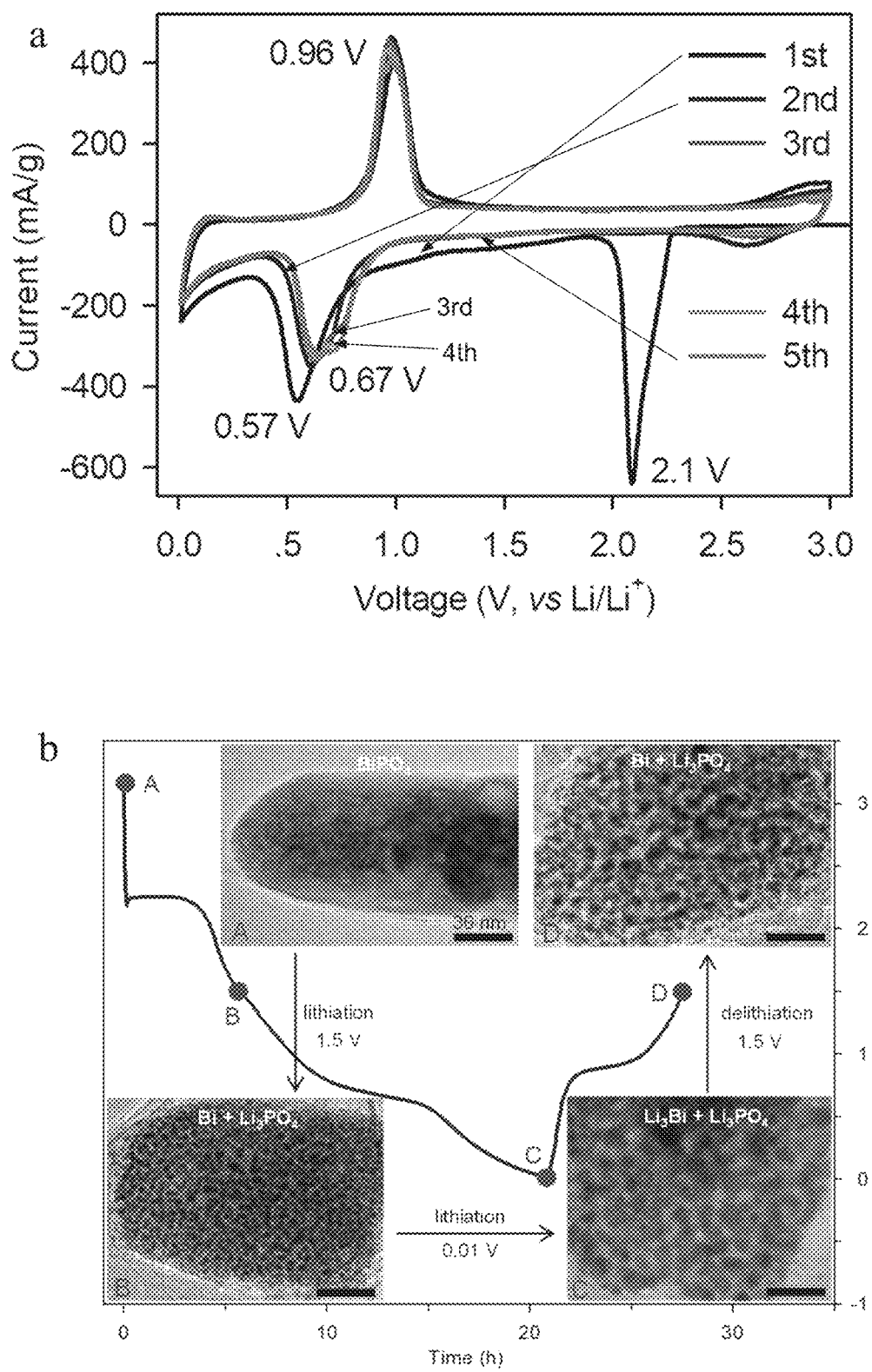
FIG. 4 shows electrochemical construction of Li-ion conductive Li$_3$PO$_4$ matrix. (a) Cyclic voltammetry curves of BiPO$_4$@G reveal the construction of Li$_3$PO$_4$ which is electrochemically stable within the potential window of 0-2.5 V. (b) Structural evolution of the BiPO$_4$@G at varied electrochemical stages in the initial cycle at a rate of 50 mA/g. (c,d) Ex-situ XPS reveals the chemical evolution of the BiPO$_4$ anodes. Due to the sampling depth limitation of XPS (as shown in FIG. 2f), BiPO$_4$ nanoparticles without graphene coating were used for XPS investigation.
Figure 4:
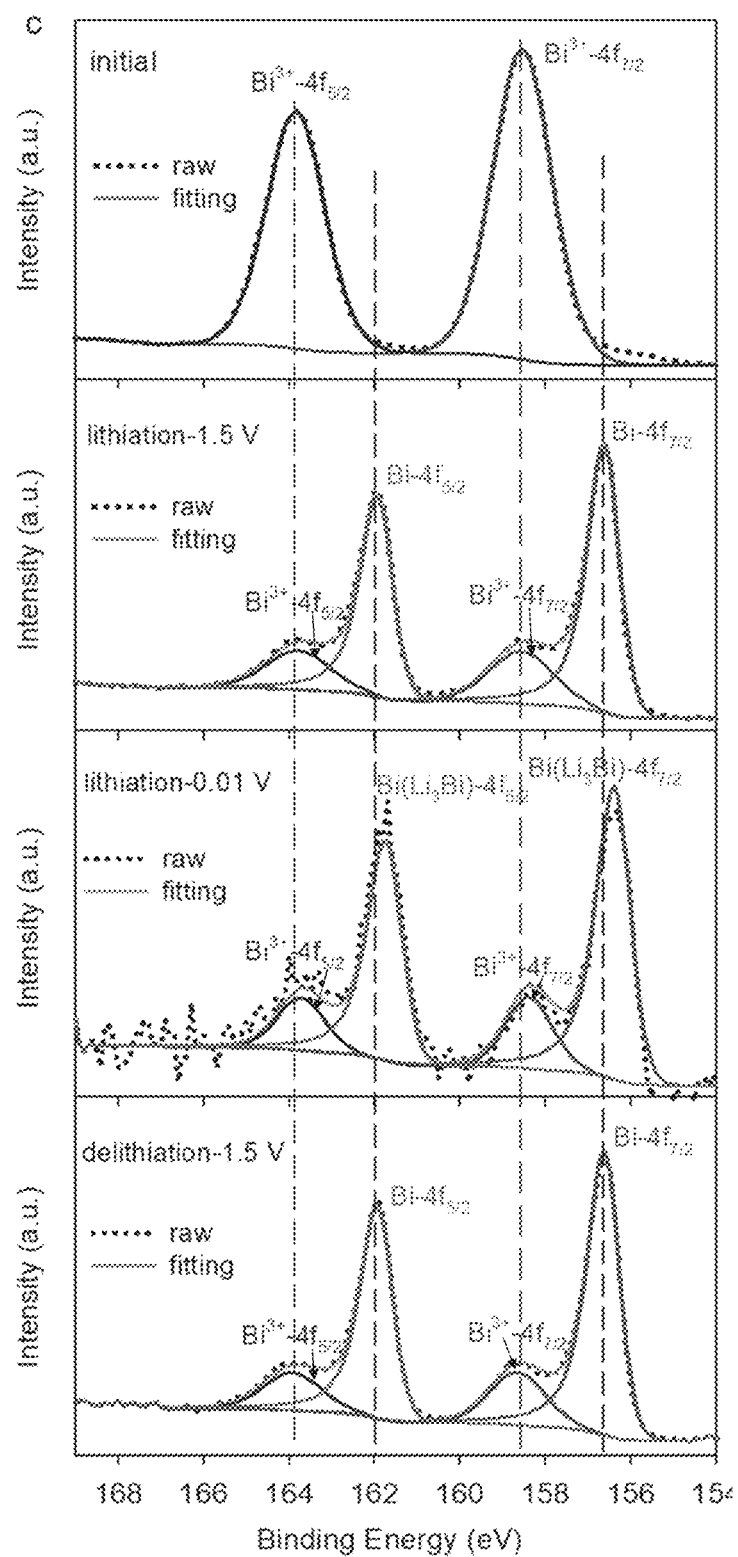
Figure 4:
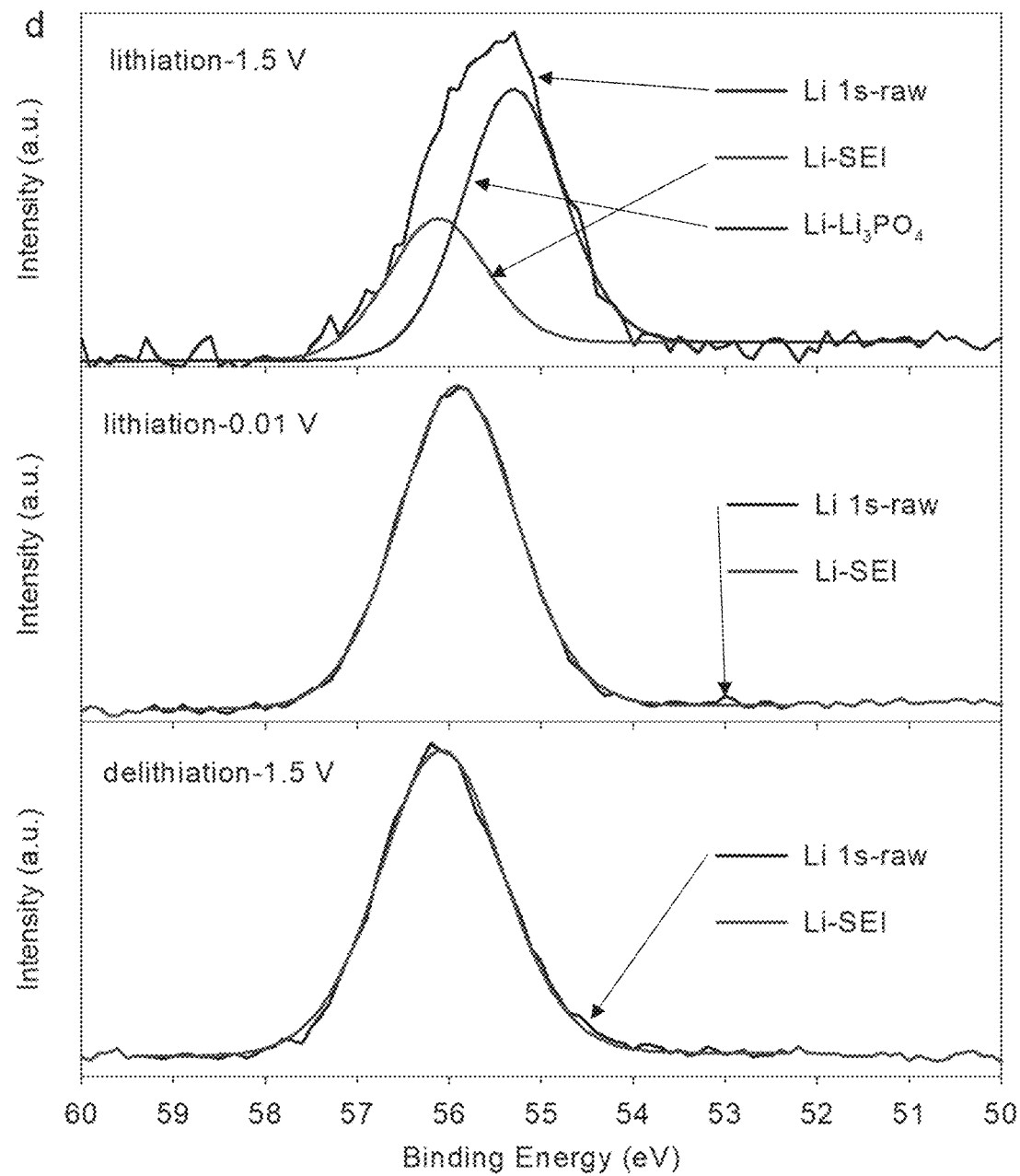
Figure 5:
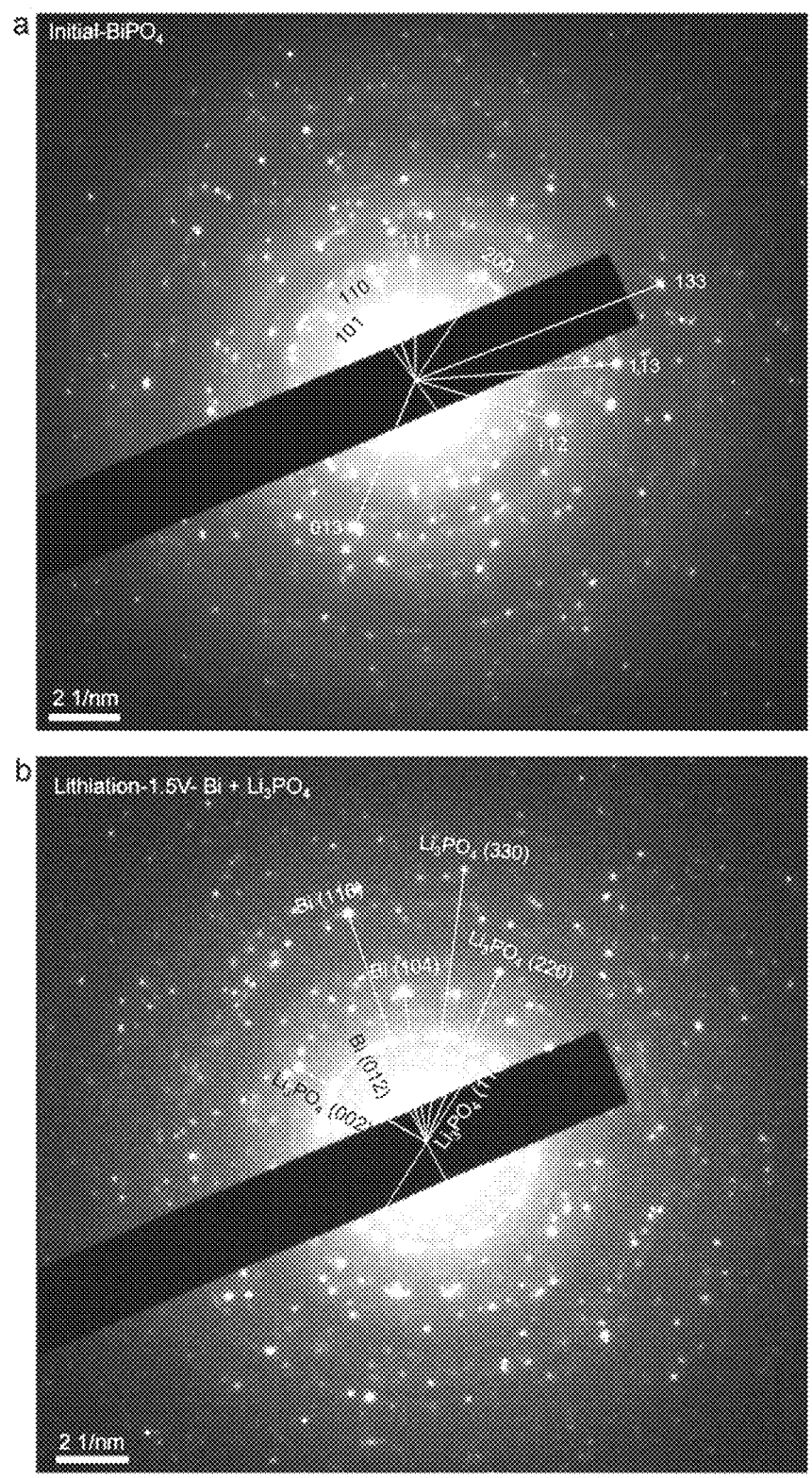
FIG. 5 shows TEM electron diffraction patterns confirming the chemical evolution of BiPO$_4$ upon lithiation/delithiation. (a) shows initial BiPO$_4$, (b) shows lithiation-1.5V Bi+Li$_3$PO$_4$, (c) shows lithiation 0.01 V Li$_3$Bi+Li$_3$PO$_4$, and (d) shows dilithiation 1.5 V Bi+Li$_3$PO$_4$.
Figure 5:
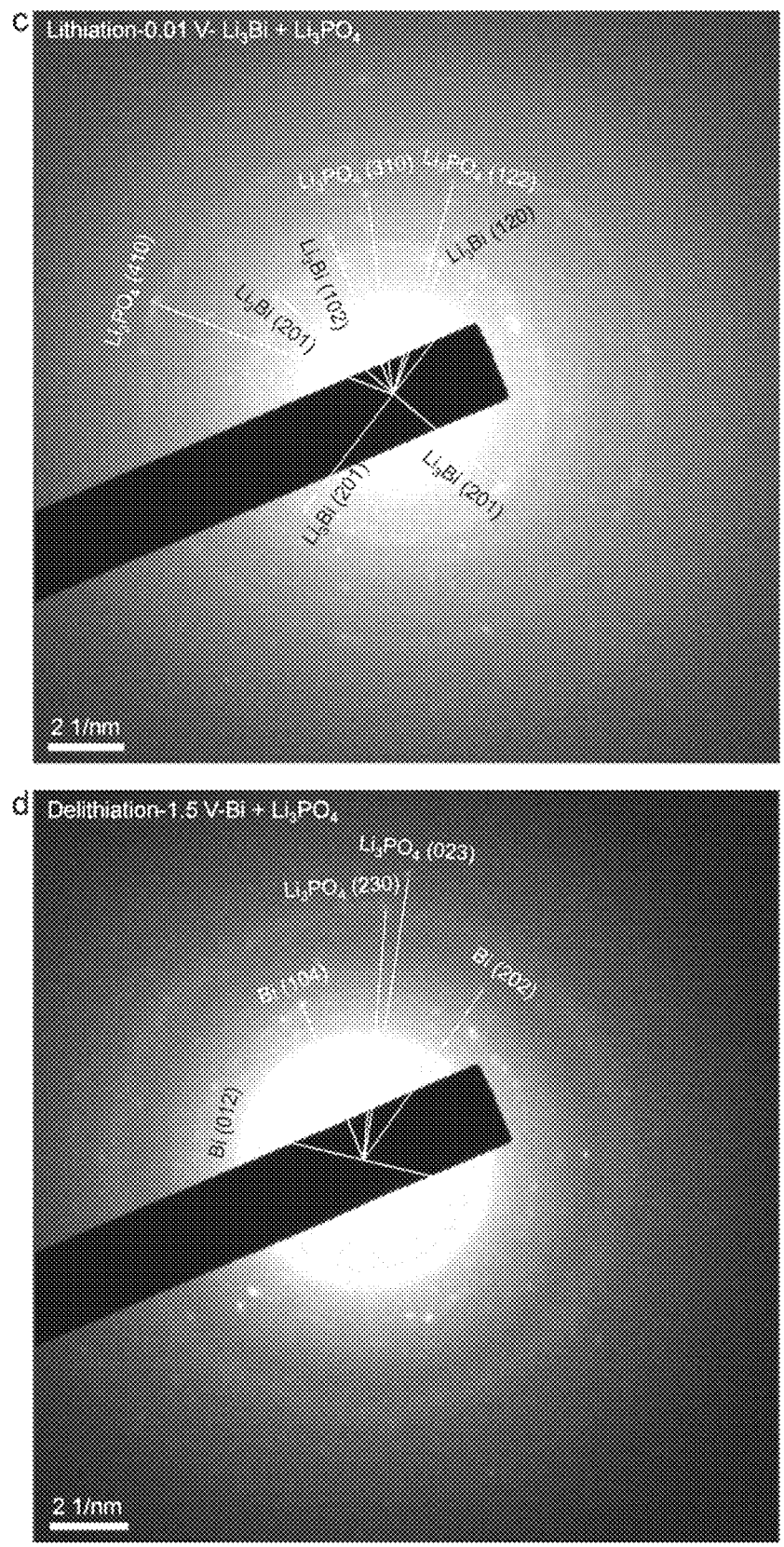
Figure 6:
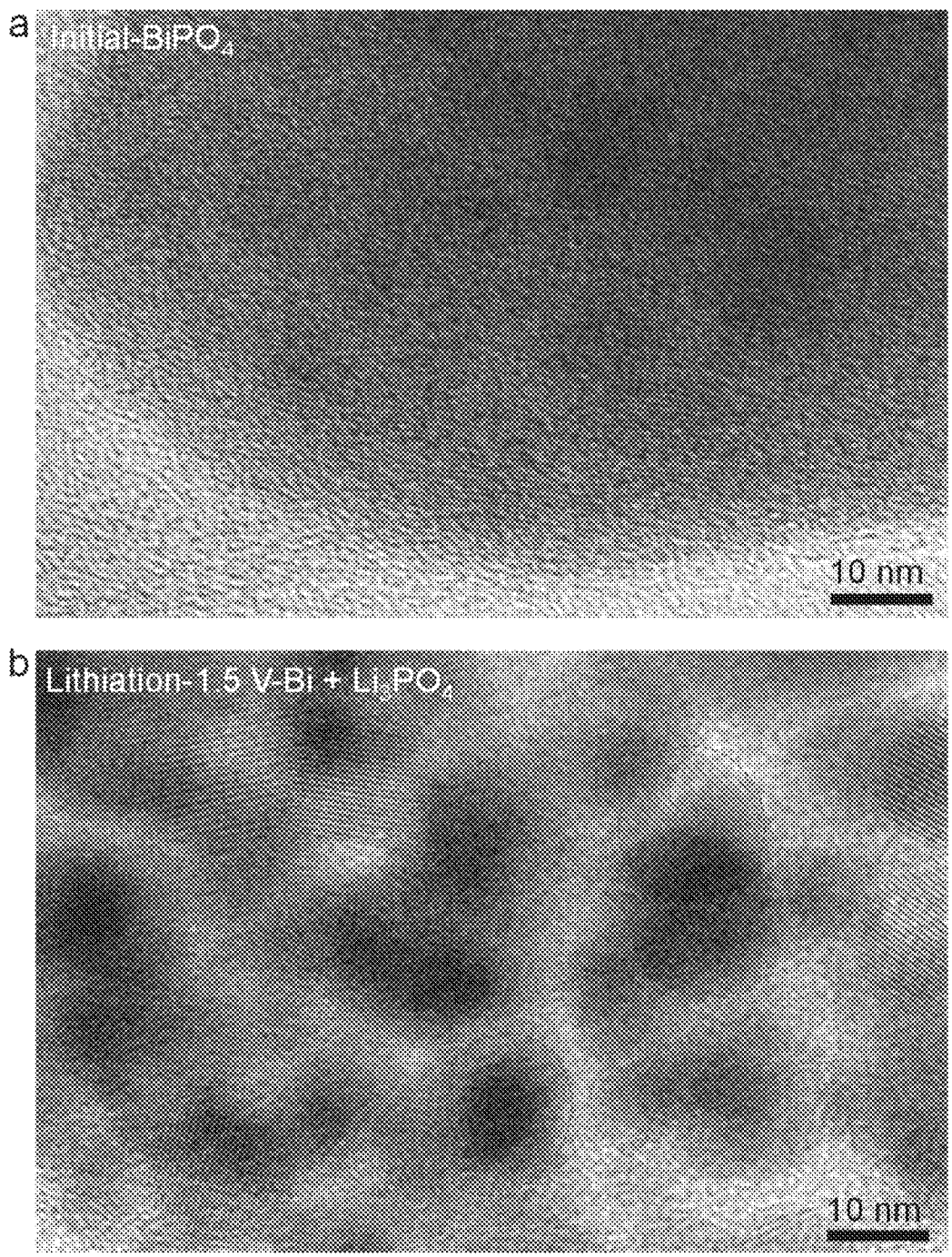
FIG. 6 shows HRTEM images revealing the structural evolution of BiPO$_4$ upon lithiation/delithiation. The red circles in (b,d) represent the edges of the bismuth nanoparticles. (a) shows initial BiPO$_4$, (b) shows lithiation-1.5V Bi+Li$_3$PO$_4$, (c) shows lithiation-0.01 V Li$_3$Bi+Li$_3$PO$_4$, and (d) shows dilithiation-1.5 V Bi+Li$_3$PO$_4$.
Figure 6:
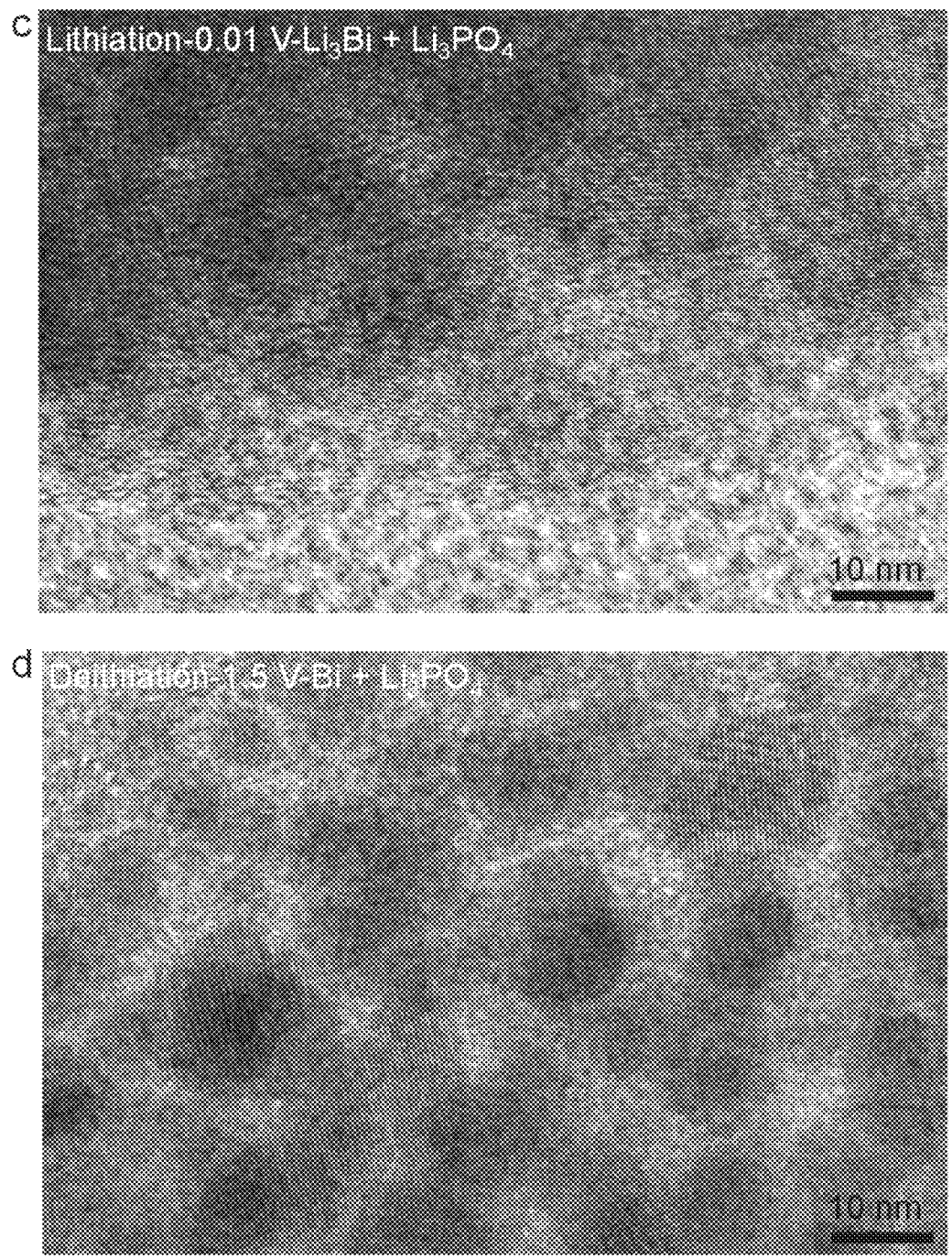
Figure 7:
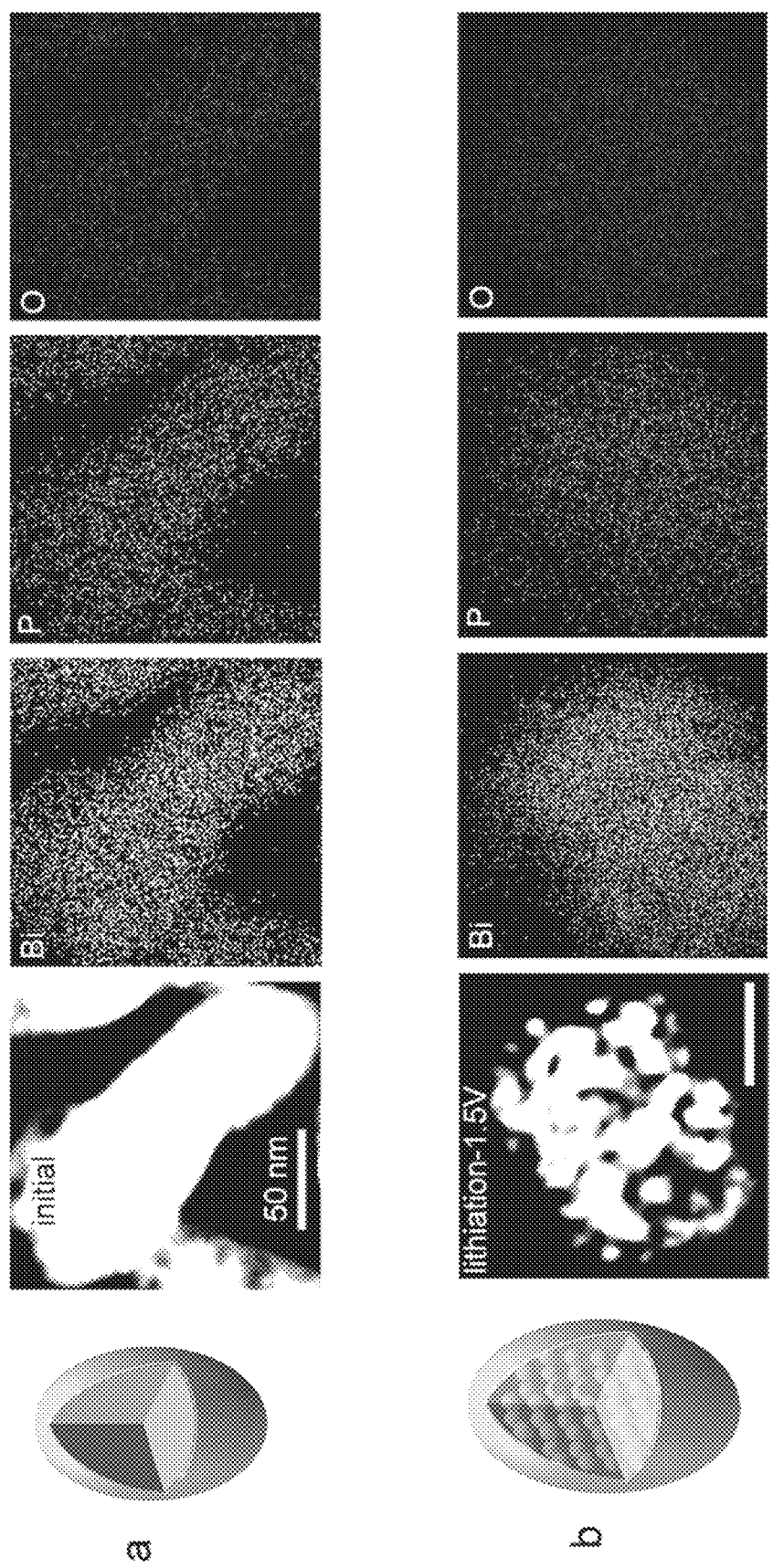
FIG. 7 shows ex-situ Dark-field TEM EDS mapping of BiPO$_4$@G shows homogeneous distributions of Bi, P and O elements at each electrochemical stage ((a) initial, (b) lithiation-1.5 V, (c) lithiation-0.01 V, and (d) dilithiation-1.5 V), evidencing homogenous embedding of Bi/Li$_3$Bi nanograins within the Li$_3$PO$_4$ matrix.
Figure 7:
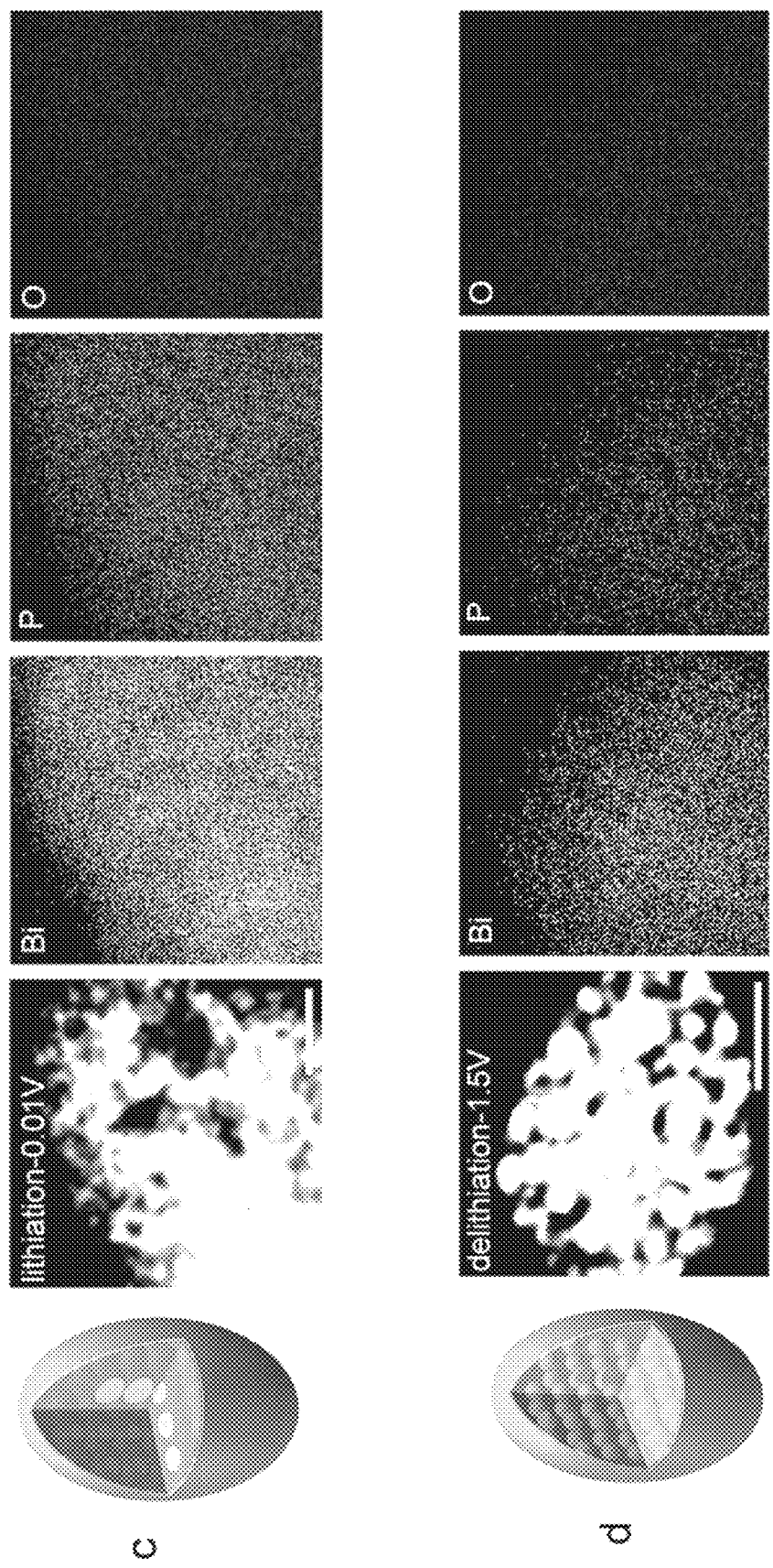

Ex-situ TEM characterizations were subsequently performed to examine both structural and chemical evolutions of the composite anodes during the first electrochemical cycle. As shown in FIG. 4b, the voltage plateau at 2.26 V (between points A and B) corresponds to the reduction of Bi$^{3+}$ to Bi$^0$, in consistence with the CV measurement. When lithiated to 1.5 V (point B), BiPO$_4$ evolves from single nanoparticles (>100 nm) into smaller Bi nanograins (~10 nm, dark contrast in TEM image) that are homogeneously embedded in a γ-Li$_3$PO$_4$ matrix (light contrast in TEM image), which is confirmed by TEM electron diffractions and energy-dispersive X-ray spectroscopy mapping (FIGS. 5b, 6b, 7). Upon further lithiation to 0.01 V (point C), lithium was inserted into bismuth to form Li$_3$Bi (FIGS. 5c, 6c) accompanying a theoretical volume expansion of ~46%. Because of this volume enlargement, Li$_3$Bi nanograins are overlapped in HRTEM images and are barely distinguishable (FIG. 6c). When extracting lithium from Li$_3$Bi (point D), the reformed Bi nanograins become distinctive again with the size returning to ~10 nm (FIGS. 5d, 6d). This reversible grain size change indicates that the γ-Li$_3$PO$_4$ matrix can effectively buffer the mechanical strain arising from lithium insertion/extraction and maintain the structural integrity at the individual nanoparticle level.

Figure 8:
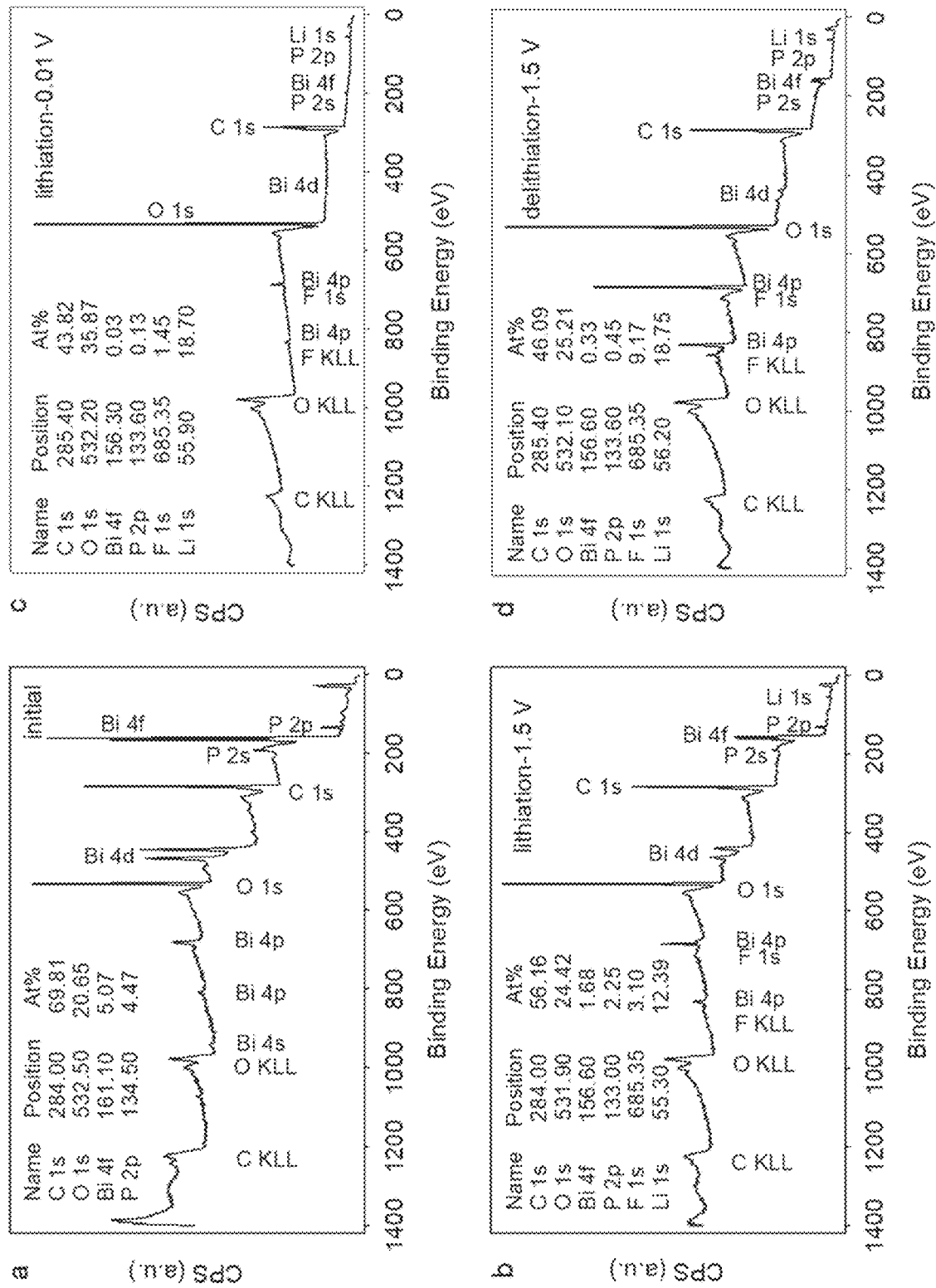
FIG. 8 shows ex-situ XPS survey analysis of BiPO$_4$-CNT composites at varied electrochemical stages ((a) initial, (b) lithiation-1.5 V, (c) lithiation-0.01 V, and (d) dilithiation-1.5 V) during the first cycle.
Figure 9:
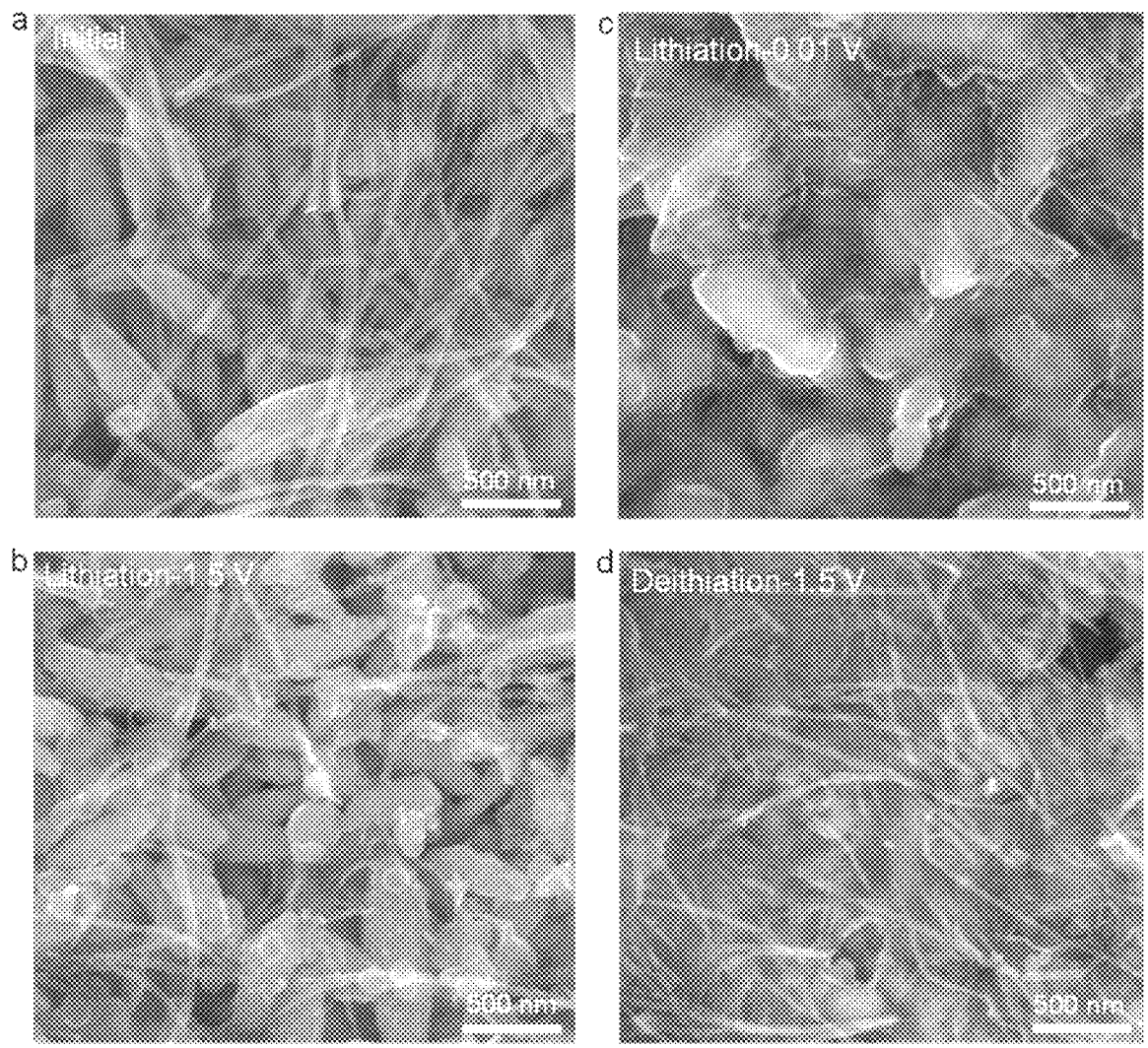
FIG. 9 shows ex-situ SEM studies show the structural evolution of BiPO$_4$@G-CNT composite electrodes at varied electrochemical stages ((a) initial, (b) lithiation-1.5 V, (c) lithiation-0.01 V, and (d) dilithiation-1.5 V) during the first cycle.

Ex-situ XPS investigations further reveal the chemical evolution of the bismuth anodes. BiPO$_4$ without graphene were adopted as the graphene coating largely limits the XPS detection (FIG. 2f). The Bi 4f XPS spectra of BiPO$_4$ present two characteristic bands of Bi$^{3+}$-4f$_{5/2}$ and Bi$^{3+}$-4f$_{7/2}$ at 158.56 and 163.79 eV, respectively (FIG. 4c). Upon lithiation to 1.5 V, two new bands appear at 156.62 and 161.94 eV and can be assigned to Bi$^0$-4f$_{5/2}$ and Bi$^0$-4f$_{7/2}$, respectively, and correspond to the reduction of Bi$^{3+}$ to Bi$^0$. The presence of Bi$^{3+}$-4f$_{5/2}$ and Bi$^{3+}$-4f$_{7/2}$ bands indicates Bi$^{3+}$ was not fully reduced, which very likely stems from the poor electrical conductivity of BiPO$_4$ in the absence of graphene. The Li is spectra show two peaks at 56.14 and 55.32 eV, related to Li$^+$ from the SEI layer (mainly Li$_2$CO$_3$, LiF and other lithium salts) and Li$_3$PO$_4$, respectively (FIG. 4d), consistent with the electrochemical construction of a Li$_3$PO$_4$ matrix. Under further lithiation to 0.01 V, the two Bi$^0$-4f bands slightly shifted to 156.39 and 161.74 eV, respectively. This small binding-energy shift is dismissed upon delithiation to 1.5 V (extraction of Li from Li$_3$Bi), and thus can be attributed to the formation of Li$_3$Bi (Bi is more electronegative than Li). The detected atomic ratio of Bi (5.07%) reduces to 0.03% at 0.01 V where the Li-1s-Li$_3$PO$_4$ peak disappears and only Li-SEI can be detected (FIG. 5d, 8), indicating XPS detection was blocked by the SEI layer (roughly 80 nm thick) which was visualized by SEM imaging (FIG. 9c).

Figure 10:
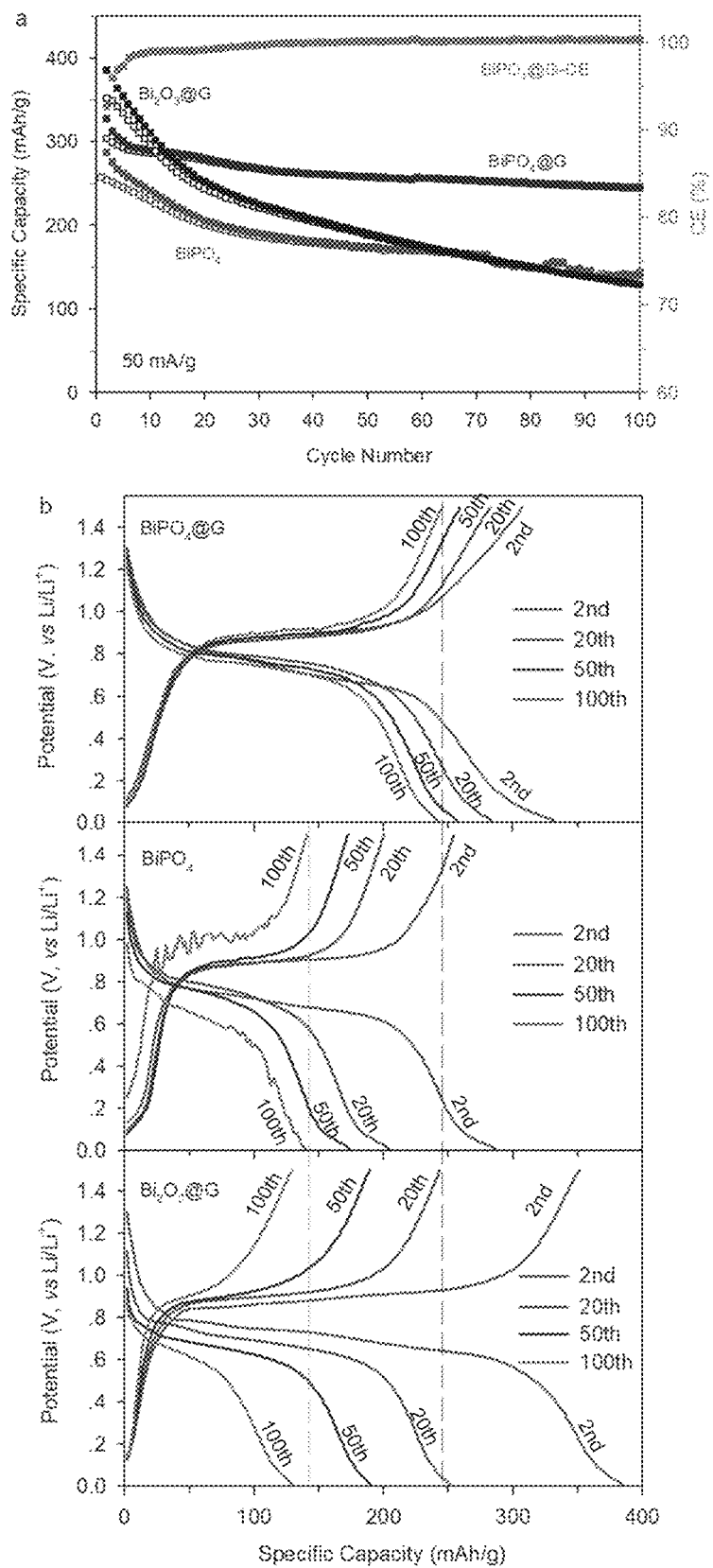
FIG. 10 shows electrochemical behaviors of BiPO$_4$@G, Bi$_2$O$_3$@G and BiPO$_4$ composite anodes in half-cell configuration with Li as both counter and reference electrodes. (a) Electrochemical cycling of the three composites at a rate of 50 mA/g in a voltage window of 0.01-1.5 V. (b) Voltage profiles of the three composites at varied cycles show superior cyclability of BiPO$_4$@G beyond the other two controls. (c) Voltage profiles show a tiny potential hysteresis of ~0.11 V which is nearly stable when raising the rate from 50 to 200 mA/g. (d) Electrochemical cyclability of the three composites at a rate of 100 mA/g. Solid and empty squares in 10a, 10d represent the lithiation and delithation capacities, respectively.
Figure 10:
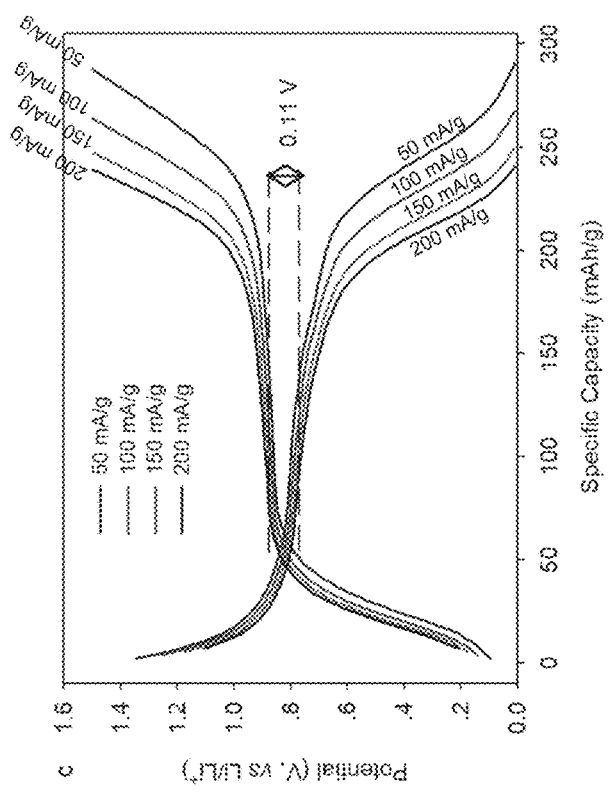
Figure 10:
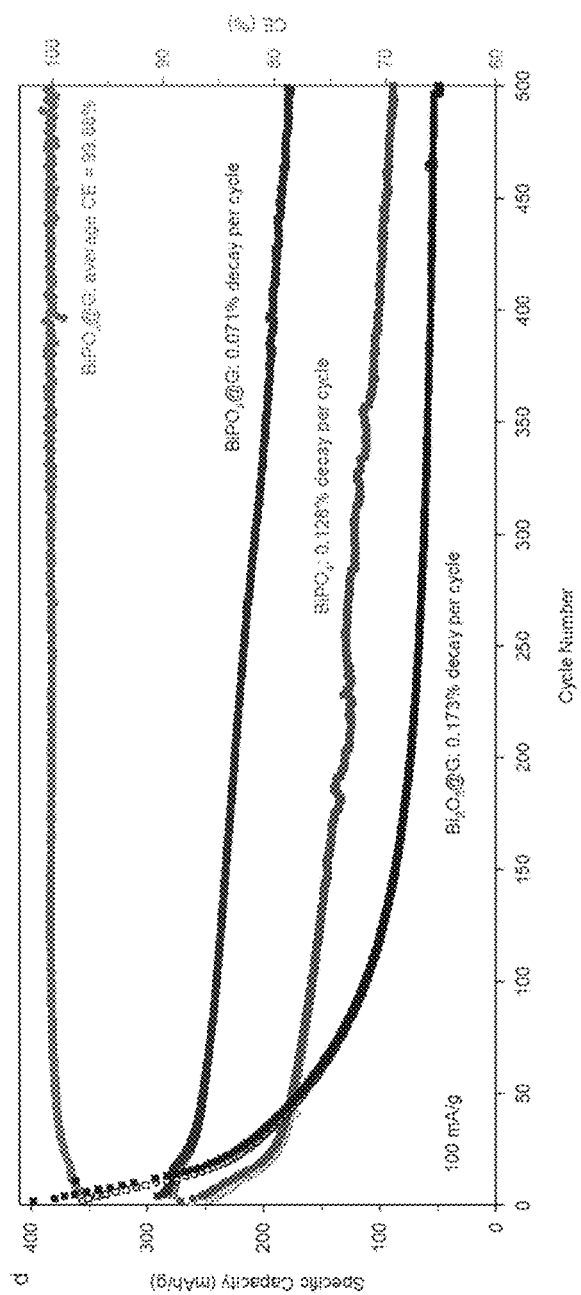

The constructed γ-Li$_3$PO$_4$ matrix significantly improved the electrochemical cycling performances of bismuth anodes. As shown in FIG. 10a, 10b, BiPO$_4$@G composites show a second cycle reversible specific capacity of 304 mAh/g at a rate of 50 mA/g (all the specific capacities herein were calculated based on the entire mass of the composites), which is comparable to that of practical graphite (~300 mAh/g) and twice of LTO. This specific capacity corresponds to an areal capacity of 1.2 mAh/cm$^2$, and a volumetric capacity of 578 mAh/cm$^{-3}$ which is also comparable to graphite (~600 mAh/cm$^{-3}$). Furthermore, after 100 cycles, the delithiation capacity is retained to 245 mAh/g, corresponding to 80.6% retention. This value is overwhelmingly superior to the previously reported Bi anode (>50% capacity loss in 30 cycles), Bi/Al$_2$O$_3$/C nanocomposite (~40% loss in 100 cycles), Bi$_2$O$_3$ (>70% loss in 15 cycles), Bi$_2$O$_3$/Ni composite (>30% loss in 40 cycles), and other abovementioned ~1 V anodes such as LiTiS$_2$ (>90% loss in 20 cycles) and LiV$_{0.5}$Ti$_{0.5}$S$_2$ (~35% loss in 100 cycles). This excellent cyclability can be attributed to the multifunctional γ-Li$_3$PO$_4$ matrix and the electrically conductive graphene coating.

To separate and evaluate the effects of γ-Li$_3$PO$_4$ matrix and graphene, we tested both Bi$_2$O$_3$@G and BiPO$_4$ composite anodes as controls. Although Bi$_2$O$_3$@G composite presents a higher second cycle capacity of 352 mAh/g, its capacity quickly drops to that of BiPO$_4$@G composites at the 11$^{th}$ cycle and continuously decays to 129 mAh/g after 100 cycles corresponding to 36.7% retention (FIG. 10a, 10b). This cyclability is better than those previously reported for Bi$_2$O$_3$ and Bi$_2$O$_3$/Ni composites but is inferior to that of BiPO$_4$@G, which indicates the electrochemically formed Li$_2$O matrix in Bi$_2$O$_3$@G underperforms the Li$_3$PO$_4$ matrix constructed in BiPO$_4$@G. Besides, Li$_2$O has a Li$^+$ conductivity of 5×10$^{-6}$ S/m, almost one order of magnitude lower compared to γ-Li$_3$PO$_4$ (4.5×10$^{-5}$ S/m), which may also account for the inferior performances of Bi$_2$O$_3$@G. For BiPO$_4$ control, it presents a second cycle delithiation capacity of 254 mAh/g, which is 16.4% less compared to BiPO$_4$@G and can be ascribed to the lower electrical conductivity in the absence of graphene. Its capacity retention of 56.7% at the 100$^{th}$ cycle is worse compared to BiPO$_4$@G but still exceeds that of Bi$_2$O$_3$@G (FIG. 10a, 10b), again demonstrating the superior functionalities of γ-Li$_3$PO$_4$ beyond Li$_2$O even without graphene coating. It is found that the capacity curve of BiPO$_4$ between 30 and 100 cycles is nearly parallel to that of BiPO$_4$@G but with a relatively lower capacity, which indicates the cyclability and structural integrity are mainly dominated by γ-Li$_3$PO$_4$ matrix while graphene provides fast electron transport and thus higher capacities. The apparent capacity decay in the first 30 cycles for both BiPO$_4$ (27.6%) and BiPO$_4$@G (12%) can be ascribed to elevated ionic resistivity due to SEI growth, a common phenomenon associated with anodes. This SEI formation was confirmed by SEM imaging (FIG. 9c, 9d) and nearly undetectable Bi signal under XPS (FIG. 8c, 8d).

Notably, the proposed BiPO$_4$@G composites achieve record cycling stability up to 500 cycles with a tiny decay rate of 0.071% per cycle (FIG. 10d) at a rate of 100 mA/g, beyond all the previously reported Bi-based anodes, to our knowledge. The capacity retentions are 81% at the 200th cycle, 74.6% at the 300th cycle, and 64.5% (180 mAh/g) at the 500th cycle. In contrast, the capacity of BiPO$_4$ composite quickly decays to 52.6% at the 200$^{th}$ cycle and 36% (89 mAh/g) at the 500$^{th}$ cycles with a decay rate of 0.128% per cycle. The capacity decay is even worse in the case of Bi$_2$O$_3$@G composite which shows retention of 20.8% at the 200$^{th}$ cycle and 13.8% at the 500$^{th}$ cycle with a decay rate of 0.173% per cycle. This fading rate is more than twice as that of BiPO$_4$@G, further demonstrating the superior functions of γ-Li$_3$PO$_4$ matrix for longtime cycling.

Figure 11:
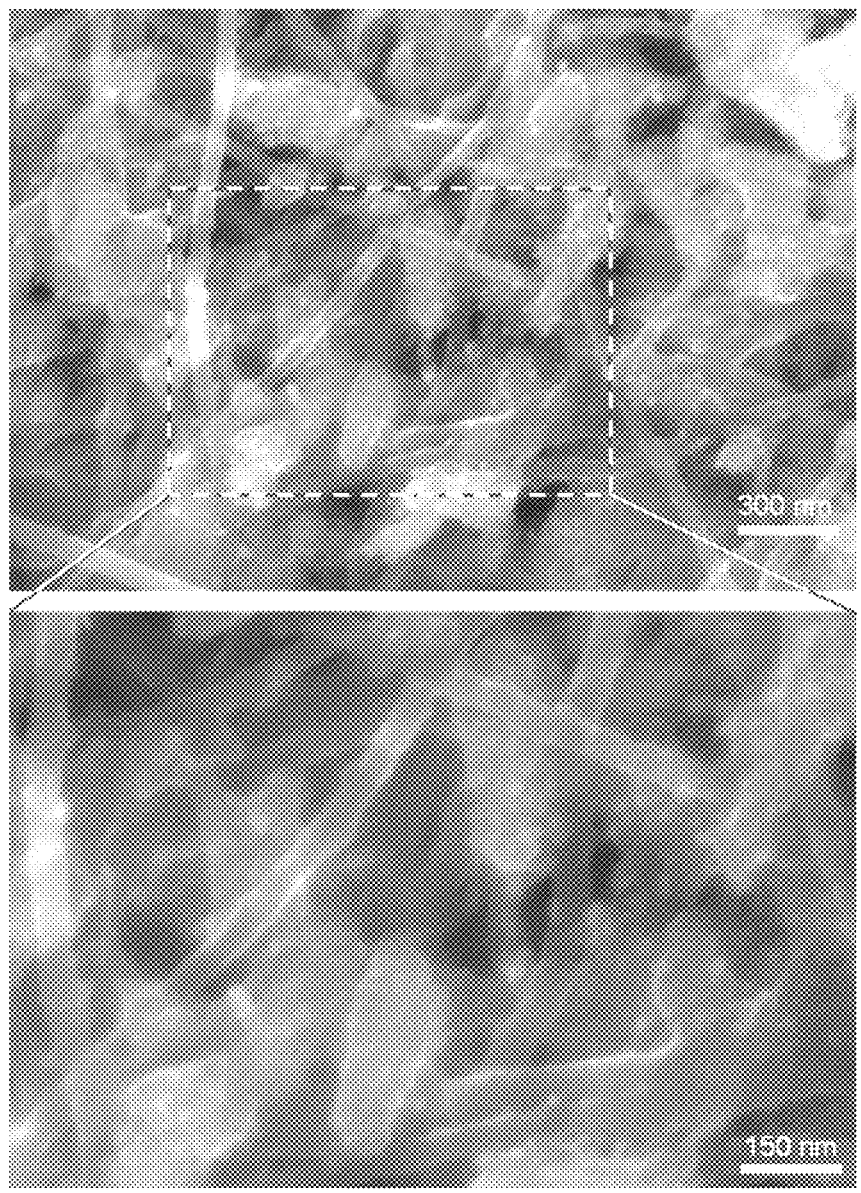
FIG. 11 shows SEM images of BiPO$_4$@G-CNT composite anode that has been electrochemically cycled 500 times show the maintenance of structural integrity of the ellipsoidal nanoparticles in direct contact with the electrically conductive CNT network. The cycled anode was washed with acetonitrile prior to SEM imaging.
Figure 12:
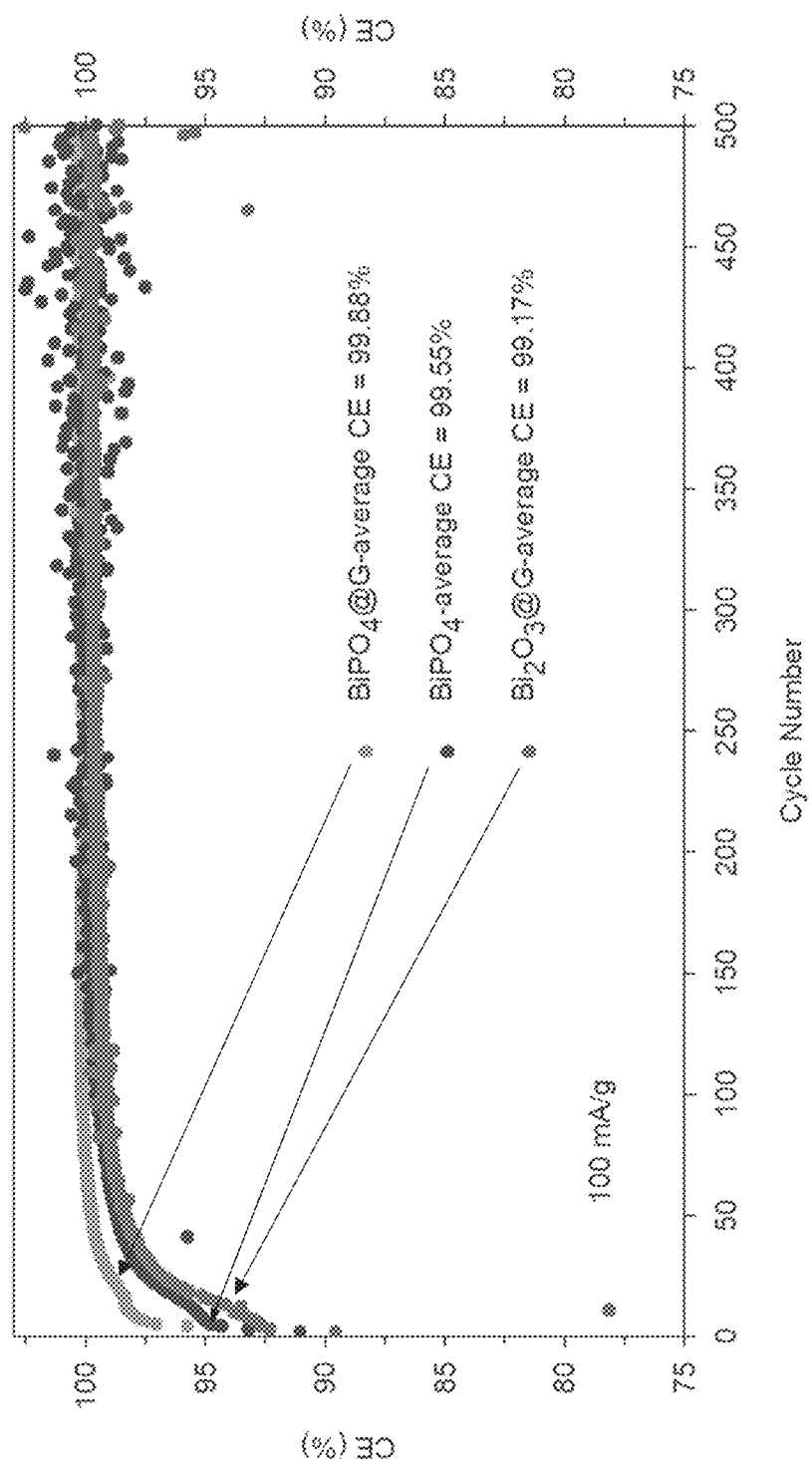
FIG. 12 shows coulombic efficiencies of BiPO$_4$@G, BiPO$_4$, and Bi$_2$O$_3$@G composite anodes at a rate of 100 mA/g in a voltage window of 0.01-1.5 V.
Figure 13:
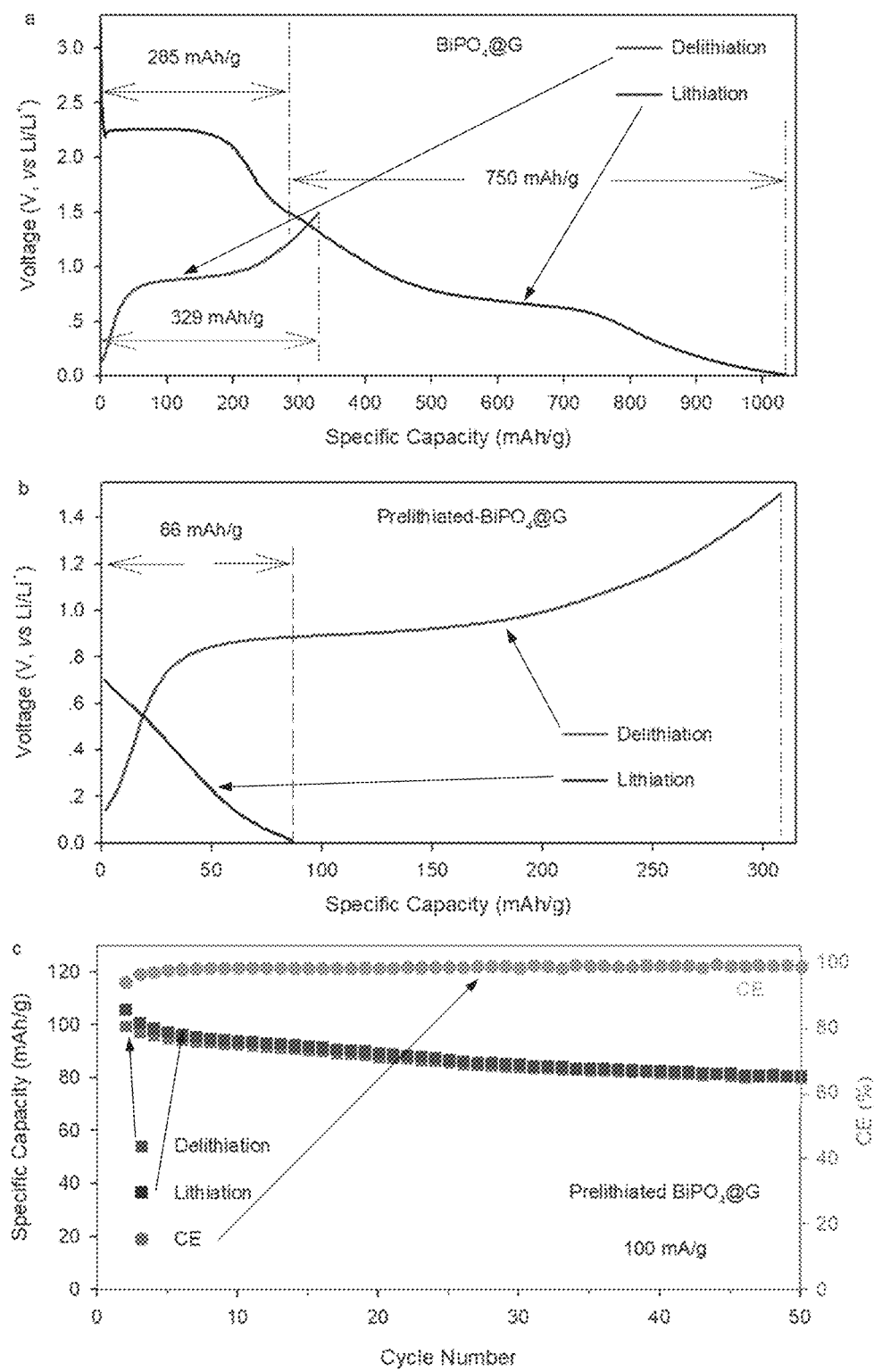
FIG. 13 shows electrochemical behaviors of pristine and prelithiated BiPO$_4$@G composites. (a,b) Voltage profile of BiPO$_4$@G (a) and prelithiated BiPO$_4$@G (b) during the first cycle at a rate of 50 mA/g. The first cycle capacity loss derives from the irreversible formation of Li$_3$PO$_4$ and SEI layer. The former occurred in the voltage window of 3.2-1.5 V and consumed a capacity of 285 mAh/g which accounts for 40.4% of all the irreversible capacity. The latter takes up the other 59.6% (421 mAh/g) on the assumption that all the irreversible capacity within the voltage range of 1.5-0.01 V contributes to the SEI growth. (c) Electrochemical cycling at a rate of 100 mA/g shows a good capacity retention similar as the pristine BiPO$_4$@G composite anodes.

This record cyclability can be ascribed to the well-maintained structural integrity in the presence of Li$_3$PO$_4$ matrix. To confirm this, the cycled composite anodes were checked by SEM. Indeed, the cycled nanoparticles still remain the ellipsoidal feature even after 500 cycles although their surface became rougher, and are firmly connected to the CNT network just as they were in the original composites (FIG. 11). Therefore, all the structural, ionic, and electrical integrities were well maintained. This structural stability is also manifested by an average Coulombic efficiency (CE) as high as 99.88% from 2 to 500 cycles for BiPO$_4$@G (FIG. 10d), which is apparently higher than those of BiPO$_4$ (99.55%) and Bi$_2$O$_3$@G (99.17%) (FIG. 12). For the initial cycle, a relatively low CE (31.8%), a common phenomenon for conversion-type anodes, derives from the irreversible formation of Li$_3$PO$_4$ and SEI layer (FIG. 13). Here we adopted the commonly practiced prelithiation to compensate the initial irreversible capacity. As shown in FIG. 13b, the prelithiated BiPO$_4$@G composite (see experimental details in Supporting Information) presents a significantly reduced initial lithiation capacity of 86 mAh/g, merely 8.3% of that for the pristine composites. Importantly, this highly improved first cycle behavior was achieved without sacrifice of cycling stability (FIG. 13c). In addition, other prelithiation reagents such as commercial lithium powders and lithium silicide-lithium oxide nanoparticles can be also integrated into this composite anode.

Figure 14:
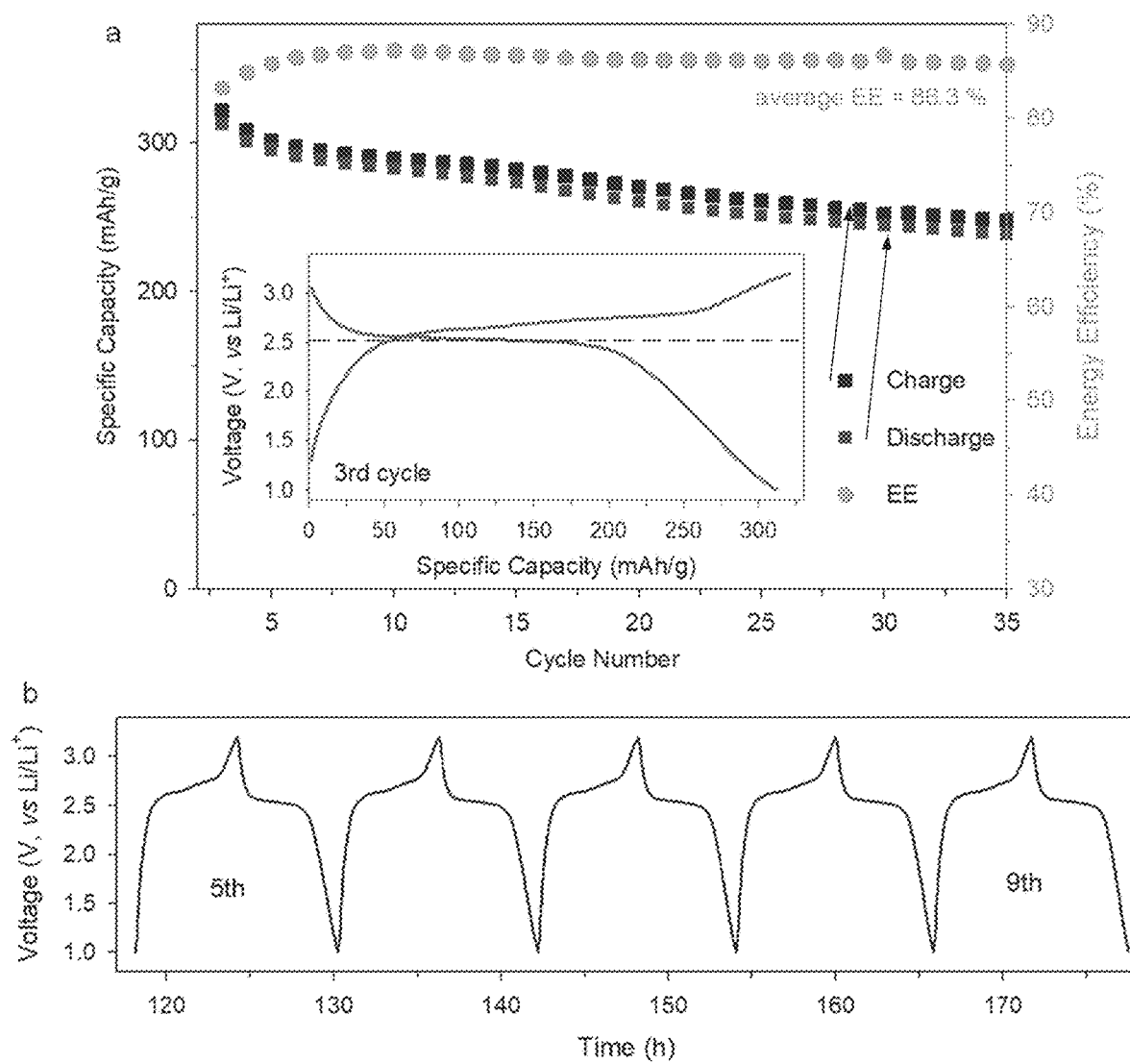
FIG. 14 shows electrochemical performances of the prototype BiPO$_4$@G-CNT/LiFePO$_4$ full-cell battery. (a) The full-cell battery demonstrates an overall voltage of ~2.5 V and a remarkable average energy efficiency of 86.3%. The charge/discharge rate is 50 mA per gram of the composite anode whose mass is used for the calculation of the specific capacity. (b) Voltage profile of the prototype full-cell shows the cell voltage is highly stable upon cycling with little voltage decay.

The BiPO$_4$@G composites also present good rate capability and tiny potential hysteresis. As shown in FIG. 10c, reversible delithiation capacities of 263, 246, and 239 mAh/g can be achieved at rates of 100, 150, 200 mA/g, respectively, corresponding to high retentions of 92%, 86%, and 84% of the capacity at 50 mA/g. And the very small potential hysteresis of ~0.11 V shows negligible change when raising the rate from 50 to 200 mA/g, thus making it possible for achieving high energy efficiencies. As a proof-of-concept, we have further fabricated full-cell batteries comprising of BiPO$_4$@G composite anodes and commercial LiFePO$_4$ cathodes. The overall capacity of such full-cells is limited by the anodes. To explore the performance of the anodes in full-cell configuration, excess cathode material was applied and the capacity was calculated based on the mass of anodes. These full-cells, as representatively shown in FIG. 14a, are capable of delivering a similar capacity (312 mAh/g) as achieved in the half-cell configuration, and a cell voltage of ~2.5 V which is highly stable upon cycling with little voltage decay (FIG. 14b). Particularly significant, benefiting from the tiny potential hysteresis (~0.12 V), the full-cell delivers a remarkably high average energy efficiency of up to 86.3% (FIG. 5a), on par with practical LIBs (80%-90%).

It is interesting to note that bismuth and its composites have also been proposed as anodes for sodium-ion batteries but suffer inferior cyclability as well. It is expected that this "ion-conductive solid-state matrix" concept can be applied to those sodium-ion batteries where the brittleness is also the obstacle to performances, paving a way for rational incorporation of brittle anode materials into electrochemical energy storage systems.

An "ion conductive solid-state matrix" approach to address the key issue of lithium-plating-free bismuth anode, that is, its brittleness, was demonstrated. By homogeneously confining bismuth nanoparticles in a solid-state γ-Li$_3$PO$_4$ matrix that is electrochemically formed in situ, the resulting composite anode exhibits a reversible capacity of 280 mAh/g at a rate of 100 mA/g and a record cyclability among bismuth-based anodes up to 500 cycles with a capacity decay rate of merely 0.071% per cycle. The full-cell batteries fabricated from this composite anode and commercial LiFePO$_4$ cathode deliver a stable cell voltage of ~2.5 V and remarkable energy efficiency up to 86.3%, on par with practical batteries (80%-90%). It is expected that the present disclosure provides a way for harnessing bismuth-based battery chemistry for the design of high capacity, safer lithium-ion batteries to meet demanding applications such as, for example, use in electric vehicles.

Although the present disclosure has been described with respect to one or more particular embodiments and/or examples, it will be understood that other embodiments and/or examples of the present disclosure may be made without departing from the scope of the present disclosure.

The invention claimed is:

1. A composite anode comprising:
   a plurality of nanostructures, each nanostructure comprising:
      a plurality of bismuth nanoparticles; and
      a lithium phosphate; and
      a layer of carbon conducting material comprising graphene, reduced graphene oxide, or amorphous carbon,
   wherein the bismuth nanoparticles are disposed in the lithium phosphate, and
   wherein the layer of carbon conducting material forms at least a portion of an exterior surface of the nanostructure and is disposed on at least a portion of an exterior surface of the lithium phosphate; and
   a carbon bulk conducting material.

2. The composite anode of claim 1, wherein the bismuth nanoparticles comprise 1 weight % to 64 weight % of the composite anode.

3. The composite anode of claim 1, wherein the bismuth nanoparticles have a size of 1 to 100 nanometers.

4. The composite anode of claim 1, wherein the bismuth nanoparticles are homogenously distributed in the lithium phosphate.

5. The composite anode of claim 1, wherein at least a portion of the plurality of bismuth nanoparticles are in electrical contact through carbon.

6. The composite anode of claim 1, wherein the layer of carbon conducting material is graphene and the layer has 1 to 100 graphene layers.

7. The composite anode of claim 1, wherein the carbon bulk conducting material is a plurality of carbon nanotubes, a graphene-containing material, or a combination thereof.

8. The composite anode of claim 1, wherein the composite anode exhibits a reversible delithiation capacity of 100-305 mAh/g at a rate of 50 mA/g.

9. The composite anode of claim 1, wherein the composite anode is cycled 100-500 cycles with a capacity decay rate of 0.19%-0.071%.

10. The composite anode of claim 1, wherein the plurality of bismuth nanoparticles is formed in situ.

11. The composite anode of claim 10, wherein the plurality of bismuth nanoparticles are electrochemically formed in situ from bismuth phosphate.

12. The composite anode of claim 11, wherein the bismuth phosphate is at least partially encapsulated by a carbon conducting material comprising graphene, reduced graphene oxide, or amorphous carbon.

13. A battery comprising:
a composite anode of claim 1;
a cathode;
an electrolyte; and
optionally, a separator.

14. The battery of claim 13, wherein the battery is a lithium-ion-conducting battery, a sodium-ion-conducing battery, or a potassium-ion conducting battery.

15. The battery of claim 13, wherein the battery is a rechargeable battery.

16. The battery of claim 13, wherein the battery further comprises a cathode-side current collector and/or an anode side current collector.

17. The battery of claim 13, wherein the composite anode, the cathode, the electrolyte, and, optionally, the cathode-side current collector and/or an anode side current collector, form a cell, and the battery comprises a plurality of the cells and each adjacent pair of cells is separated by a bipolar plate.

* * * * *